April 3, 1951 J. A. ZINN, JR 2,547,899
PRESSURE MECHANISM FOR BOX FORMING MACHINES
Filed June 4, 1947 15 Sheets-Sheet 1
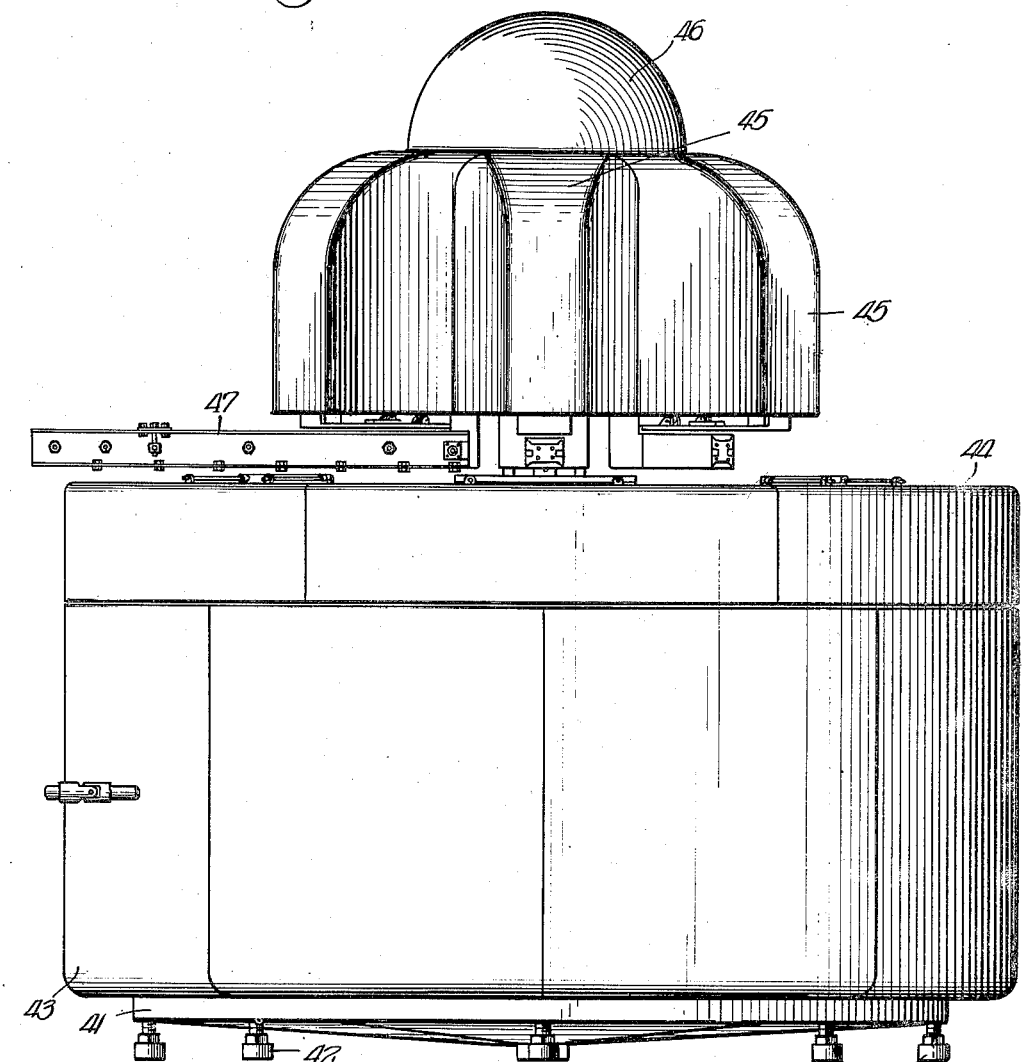
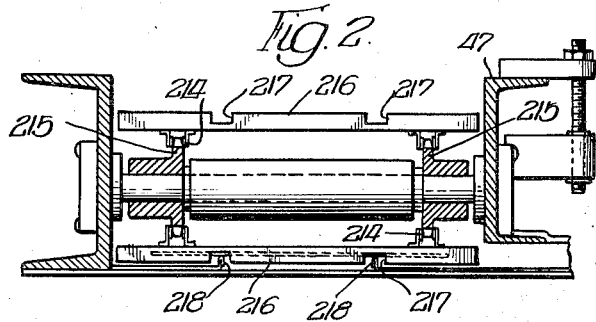
INVENTOR.
Julius A. Zinn, Jr.,
BY April 3, 1951   J. A. ZINN, JR   2,547,899
PRESSURE MECHANISM FOR BOX FORMING MACHINES
Filed June 4, 1947   15 Sheets-Sheet 2

INVENTOR.
Julius A. Zinn, Jr.,
BY
Wilkinson Huxley Byron & Hume
Attys.

April 3, 1951   J. A. ZINN, JR   2,547,899
PRESSURE MECHANISM FOR BOX FORMING MACHINES
Filed June 4, 1947   15 Sheets-Sheet 4

INVENTOR.
Julius A. Zinn, Jr.,
BY
Wilkinson Huxley Byron & Hume
ATTYS

April 3, 1951  J. A. ZINN, JR  2,547,899
PRESSURE MECHANISM FOR BOX FORMING MACHINES
Filed June 4, 1947  15 Sheets-Sheet 6

INVENTOR.
Julius A. Zinn, Jr.,
BY
Wilkinson Huxley Byron & Hume
ATTYS.

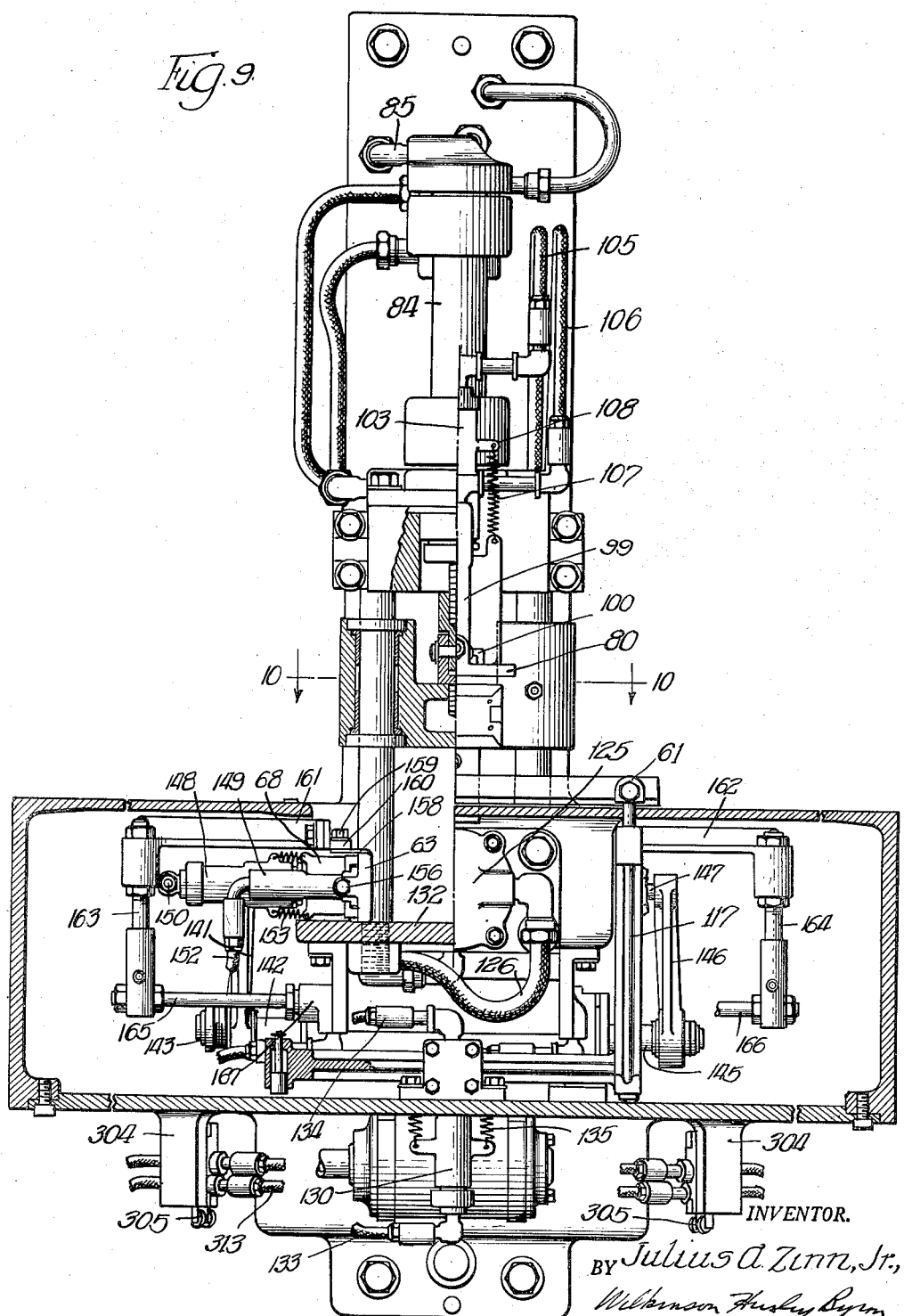

April 3, 1951  J. A. ZINN, JR  2,547,899
PRESSURE MECHANISM FOR BOX FORMING MACHINES
Filed June 4, 1947  15 Sheets-Sheet 8
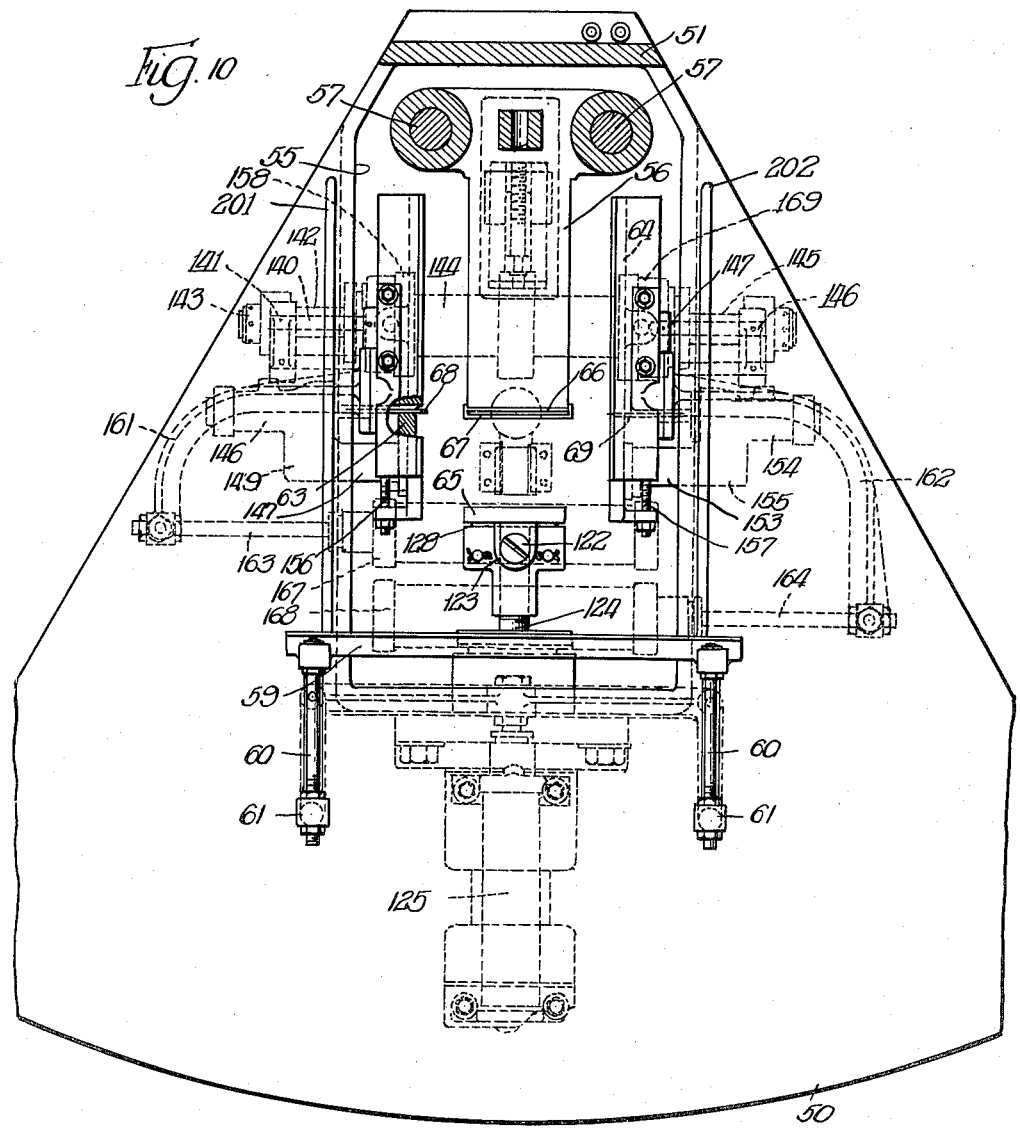
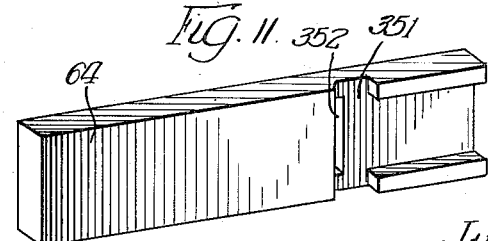
INVENTOR.
Julius A. Zinn, Jr.,
BY
Wilkinson Huxley Byron & Hume
ATTYS.

April 3, 1951           J. A. ZINN, JR           2,547,899
PRESSURE MECHANISM FOR BOX FORMING MACHINES
Filed June 4, 1947           15 Sheets-Sheet 9
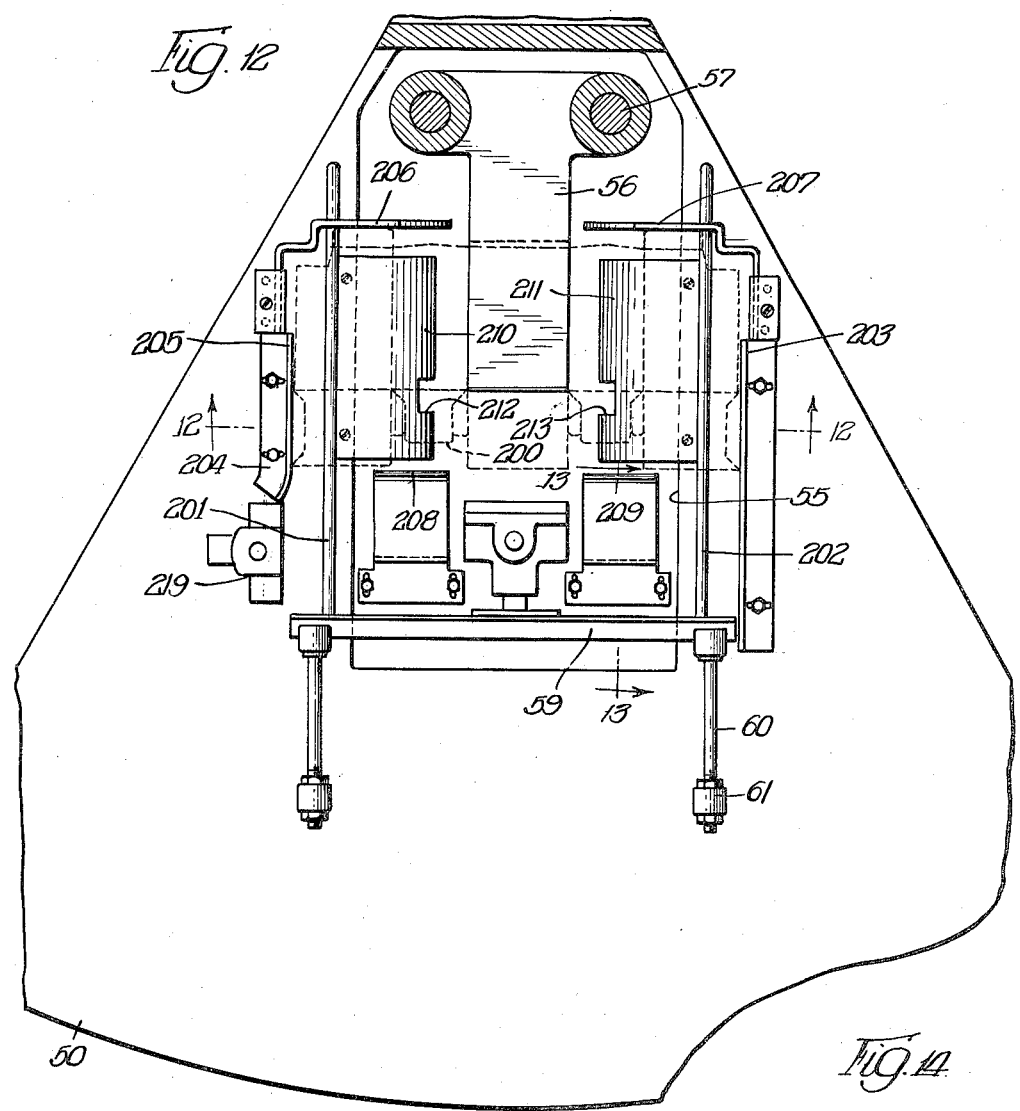
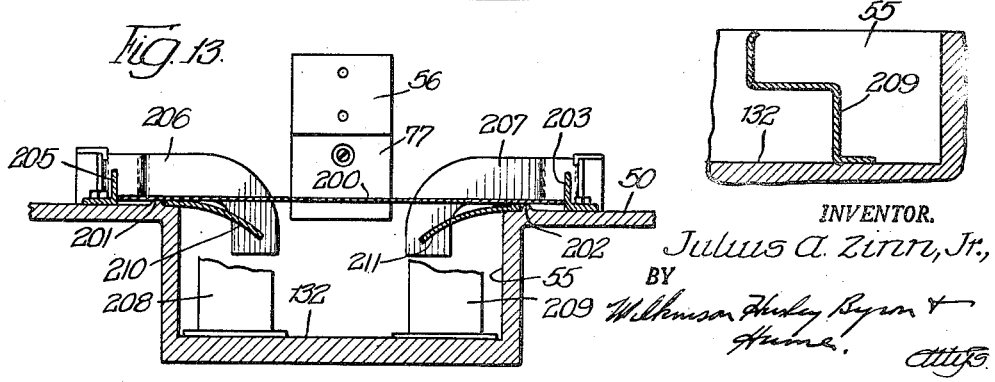
INVENTOR.
Julius A. Zinn, Jr., April 3, 1951 J. A. ZINN, JR 2,547,899
PRESSURE MECHANISM FOR BOX FORMING MACHINES
Filed June 4, 1947 15 Sheets-Sheet 10
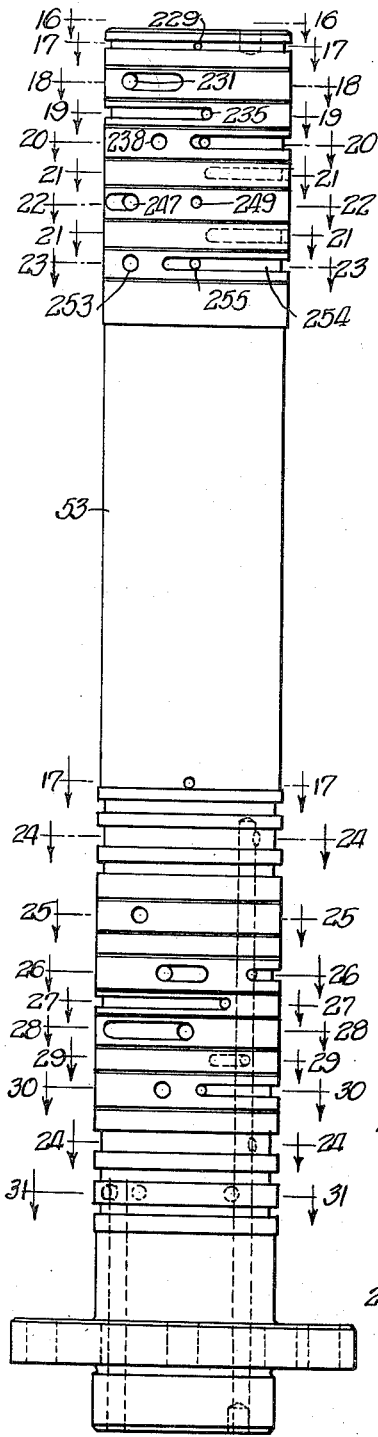
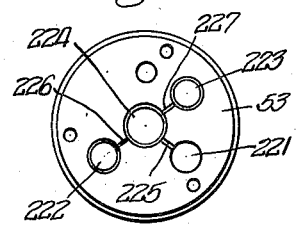
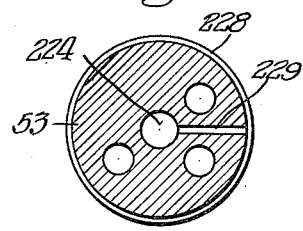
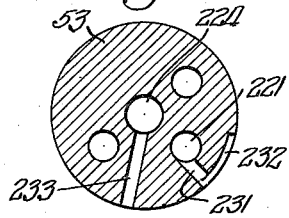
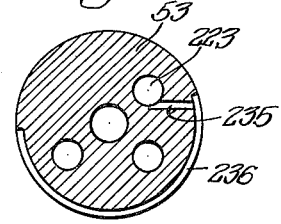
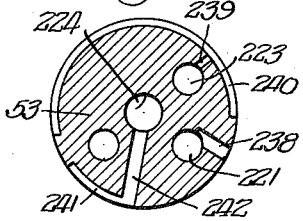
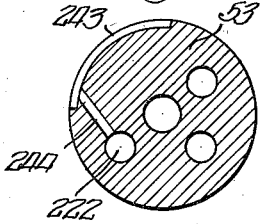
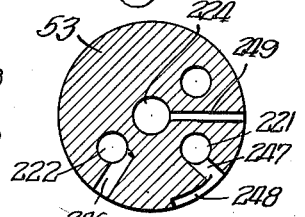
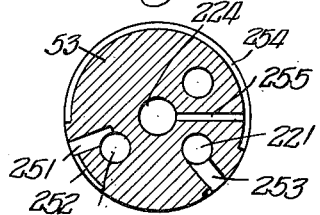
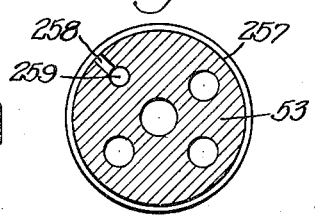
INVENTOR.
Julius A. Zinn, Jr.,
BY
Wilkinson Huxley Byron & Hume
ATTYS.

April 3, 1951   J. A. ZINN, JR   2,547,899
PRESSURE MECHANISM FOR BOX FORMING MACHINES
Filed June 4, 1947   15 Sheets-Sheet 11
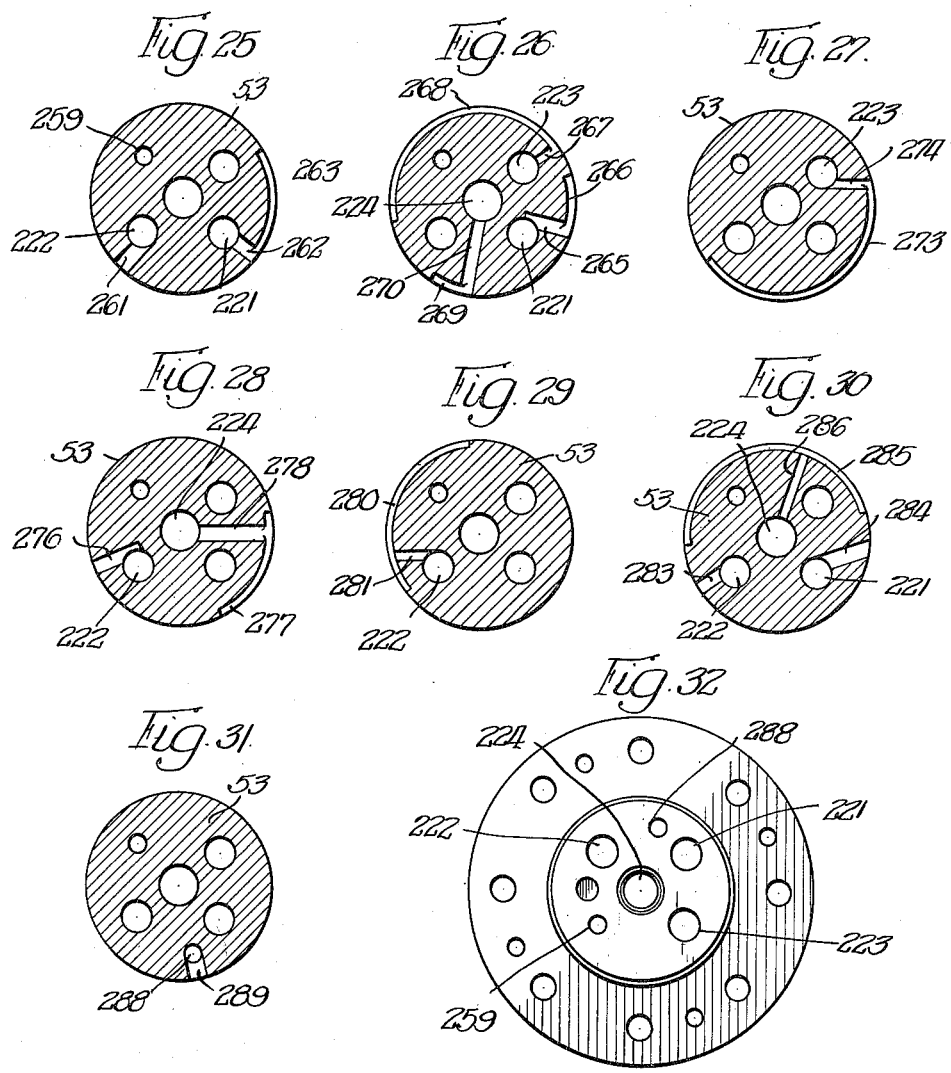
INVENTOR.
Julius A. Zinn, Jr.,
BY
Wilkinson Huxley Byron Hume
Attys.

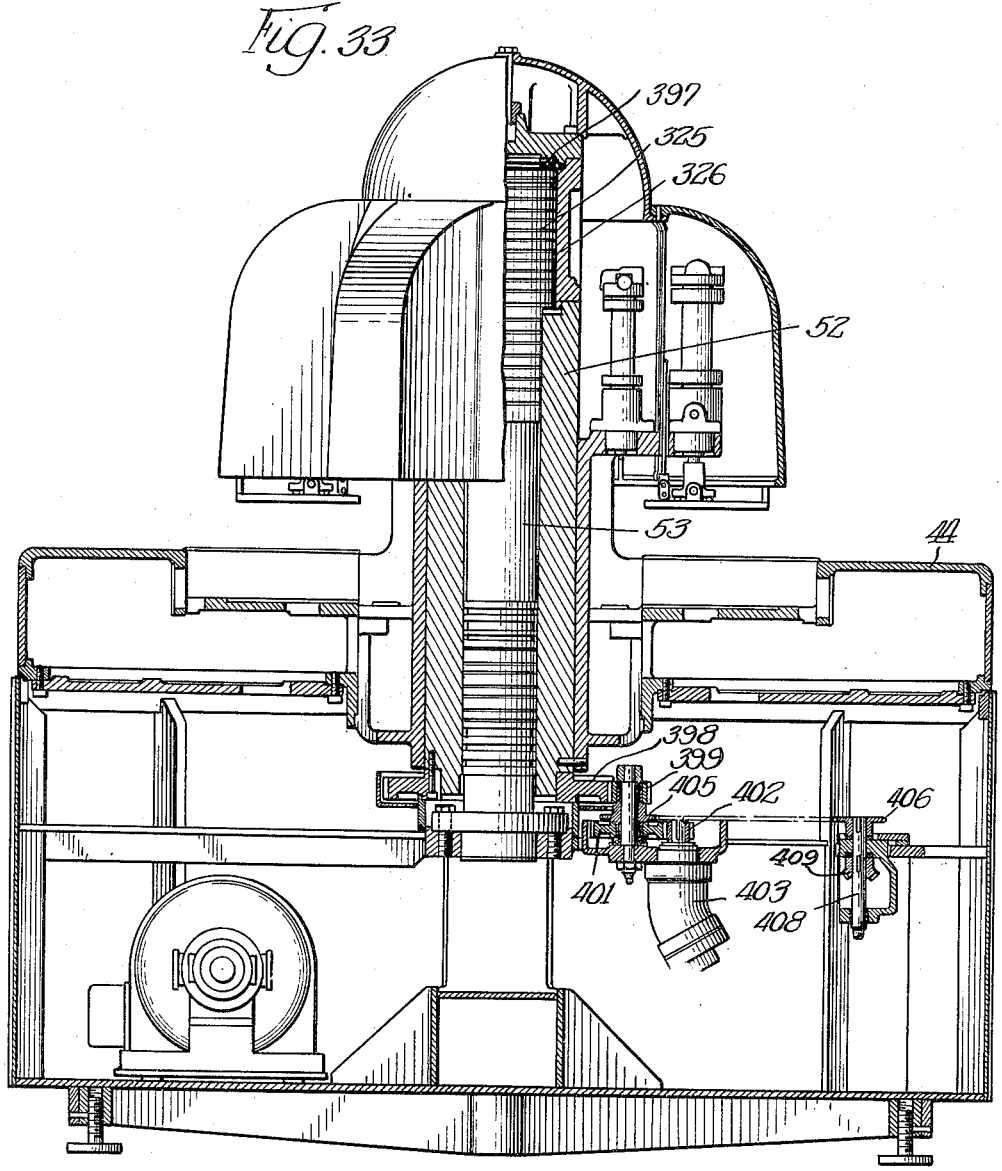

April 3, 1951     J. A. ZINN, JR     2,547,899
PRESSURE MECHANISM FOR BOX FORMING MACHINES
Filed June 4, 1947     15 Sheets-Sheet 13
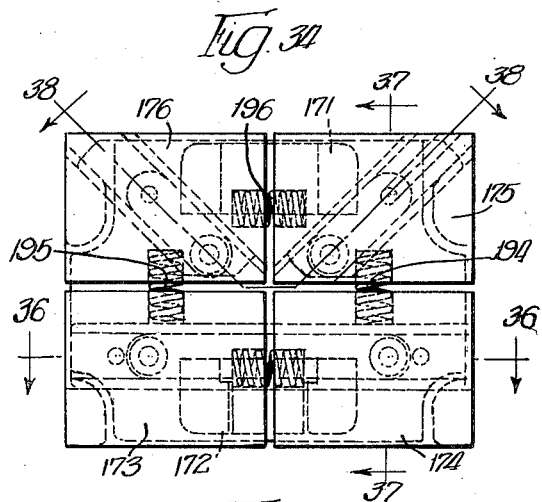
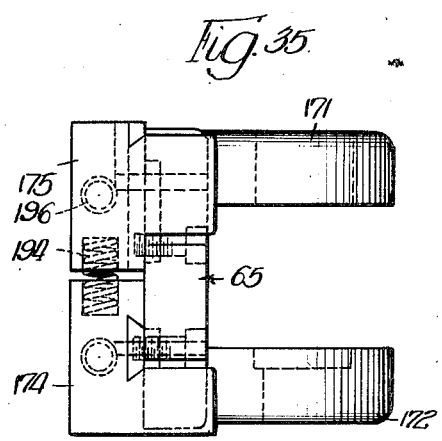
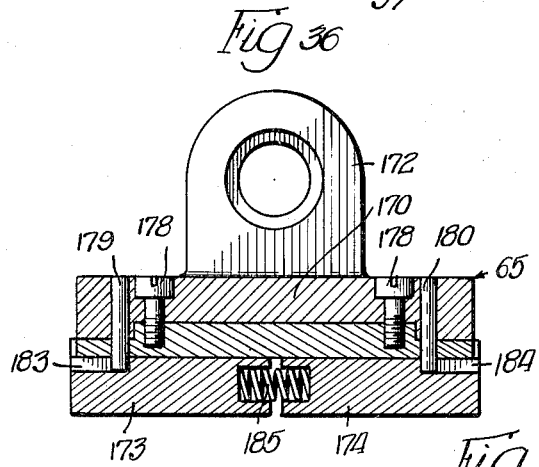
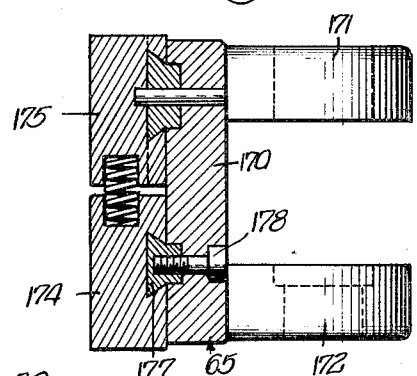
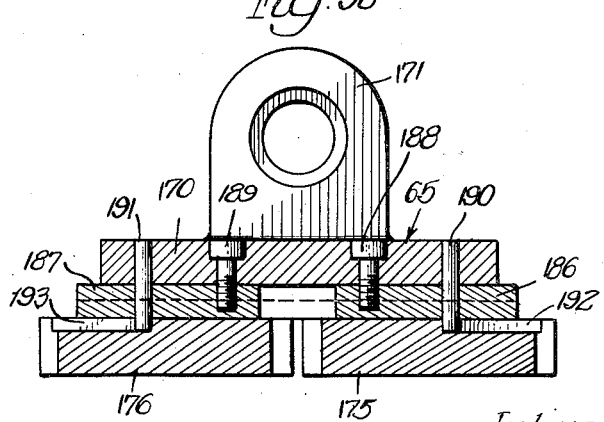
INVENTOR.
Julius A. Zinn, Jr.,
BY

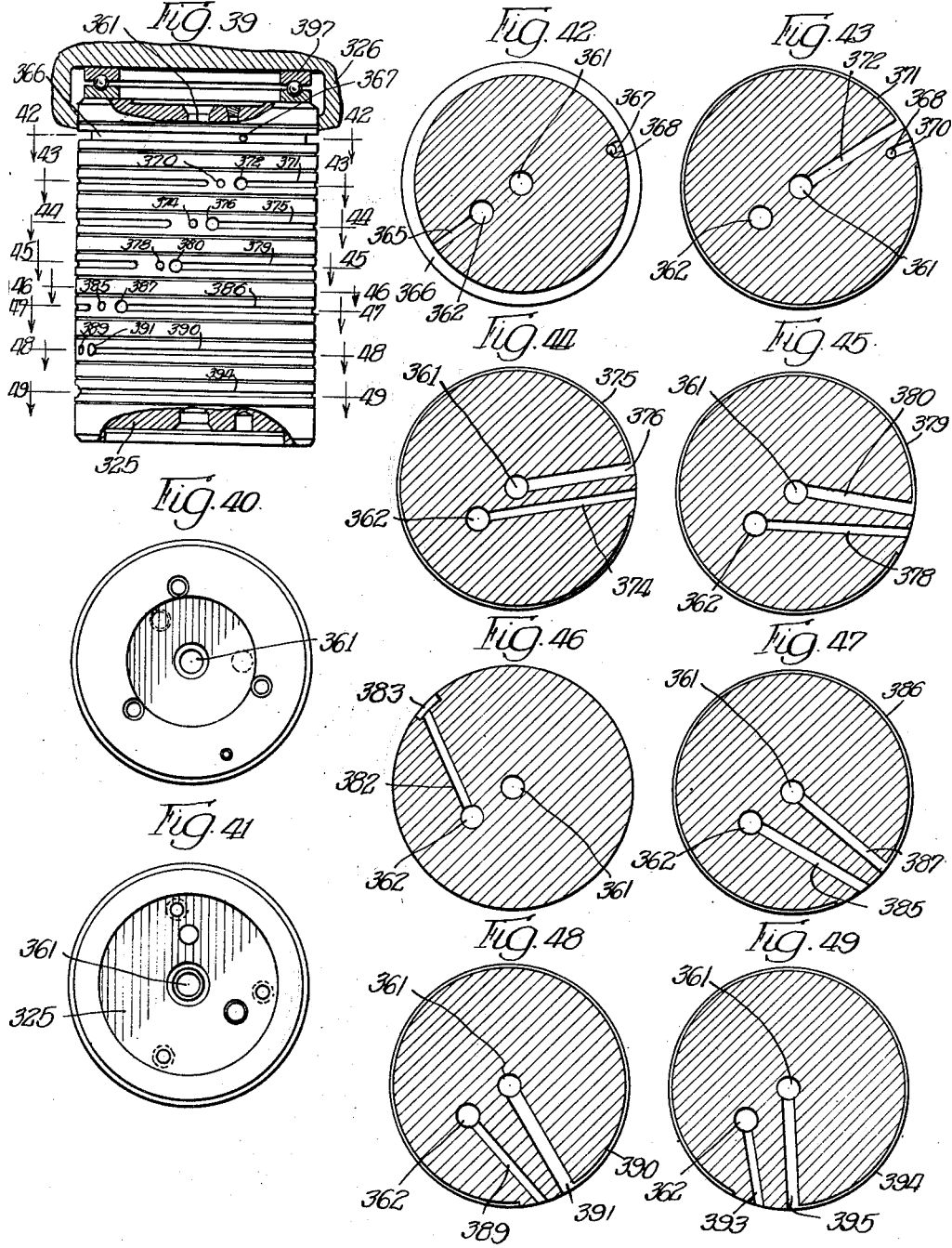

April 3, 1951  J. A. ZINN, JR  2,547,899
PRESSURE MECHANISM FOR BOX FORMING MACHINES
Filed June 4, 1947  15 Sheets-Sheet 15
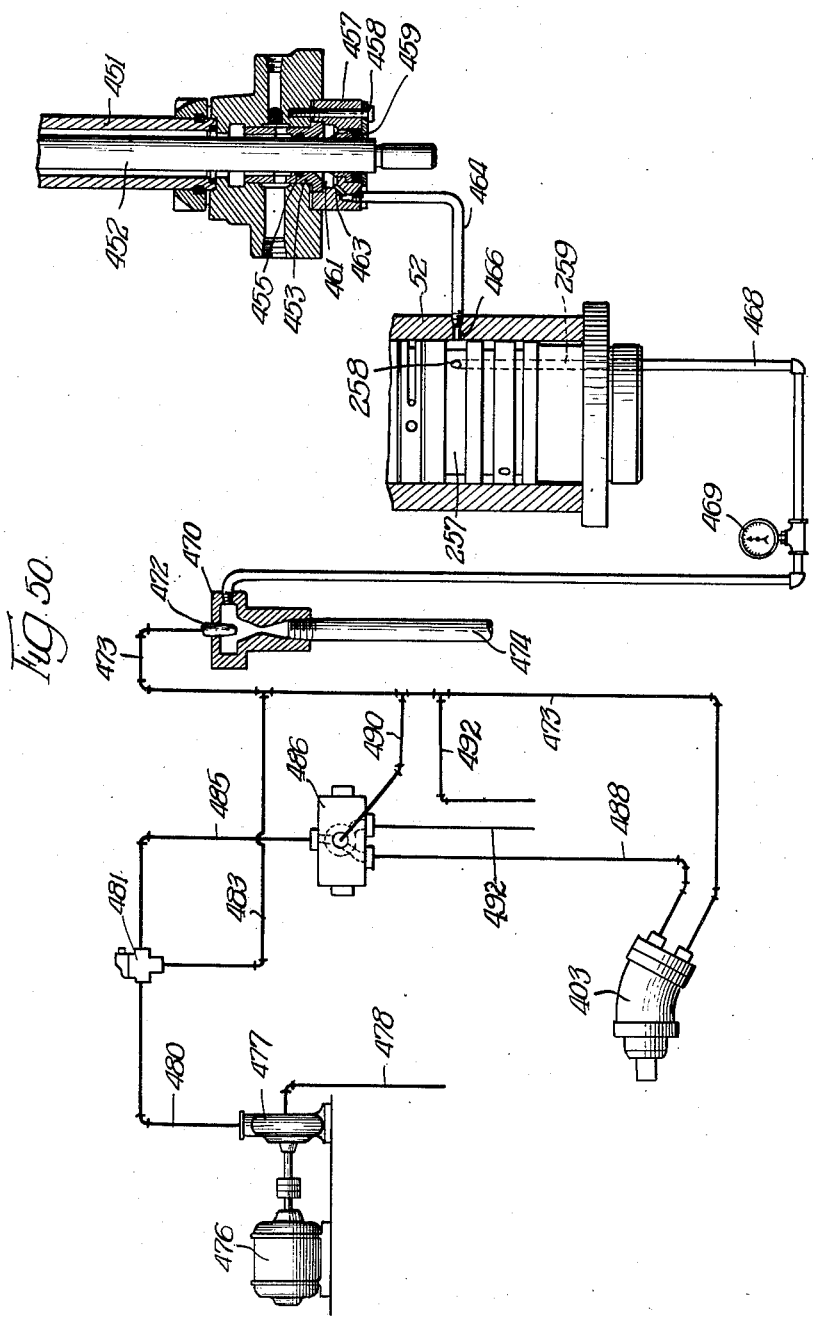
INVENTOR.
Julius A. Zinn, Jr.,
BY
Wilkinson Huxley Byron & Hume
Attys Patented Apr. 3, 1951

2,547,899

UNITED STATES PATENT OFFICE 2,547,899

PRESSURE MECHANISM FOR BOX FORMING MACHINES

Julius A. Zinn, Jr., Chicago, Ill.

Application June 4, 1947, Serial No. 752,364

22 Claims. (Cl. 93—44.1)

This invention relates to a new and improved apparatus for forming units, and more particularly to a machine for rapidly and accurately forming units to a predetermined size and shape.

The present invention is adapted for forming cartons of the character disclosed in my Patent No. 2,390,909 granted December 11, 1945, but it will be understood that it may be used to form cartons with other types of bottom closures and also for other purposes than the formation of cartons.

The present machine comprises one form of apparatus adapted for carrying out the method disclosed in my prior application Serial No. 612,177, filed August 23, 1945, now Patent No. 2,480,176, August 30, 1949.

The specific machine disclosed herein is designed to operate upon a flat blank which has been previously cut to the desired shape and scored upon the lines where folding or bending takes place during the forming operation.

As will be apparent from the detailed description which follows, the machine may be adjusted within reasonable limits to handle blanks of different sizes and shapes and may be made in different sizes for the making of cartons differing more widely in size and shape.

The machine may be used in the manufacture of a wide variety of cartons of differing thicknesses of material, but is especially designed for making cartons which will hold liquids or powdered solids without leakage or loss. It will produce cartons which are accurately constructed with all portions folded and formed to close dimensional tolerances, with corners and edges bearing an exact predetermined relationship and with bottom and side panels formed smoothly and without bulging.

An important feature of a machine of this character is speed of operation and the present machine is adapted to operate continuously at relatively high speeds. It comprises a plurality of identical forming assemblies, each of which carries out a complete forming operation. These units are independent and are interchangeable. The machine may be operated with one or more units not functioning or a unit in need of repair may be removed and replaced with a spare unit with a minimum loss of operating time.

The machine as shown is largely operated by fluid pressure. In one particular embodiment shown, certain elements are actuated by air pressure while others are hydraulically operated. In another form shown, the machine is hydraulically operated. The machine is self-contained and supplies its own fluid pressures. The hydraulic system is closed and may be operated by standard types of fluids designed for this purpose, the fluid being recirculated.

The use of fluid pressure on the various moving elements permits a positive pressure on a unit being formed, regardless of variation in thickness or compressibility of the material. This insures complete adhesion of seams without the formation of air bells or pockets.

The fluid pressure supply systems are contained in the base of the machine and deliver fluid under pressure through passages and ports in a central fixed column of cylindrical form. The several forming assemblies rotate about the central column and are each provided with ports co-acting with the column ports and with passages or piping leading the fluid to the actuating mechanism, comprising motors and motor cylinders, for the various moving elements.

It is an object of the present invention to provide a forming and shaping machine.

It is another object to provide a machine of this character in which forming, shaping and holding elements are operated by fluid pressure.

It is an additional object of the present invention to provide a new and improved machine of this character adapted for setting up and forming cartons.

It is also an object to provide a machine which is adapted to form cartons accurately to size and shape with smooth folded edges and flat sides.

It is a further object to provide a carton machine in which all formed sides are firmly held during the formation of the bottom.

It is an additional object to provide apparatus in which elements are formed and held by members operated by fluid pressure.

It is also an object to provide a fluid operated and controlled apparatus in which the flow of fluid under pressure is controlled by surfaces moving relative to each other, the surfaces being provided with co-acting orifices having passages leading thereto.

It is another object to provide a machine comprising operating assemblies rotating about a central column, the fluid actuating pressures being transmitted through the central column.

It is also an object to provide an apparatus which comprises a plurality of identical operating mechanisms which may be independently removed from and replaced upon the apparatus.

It is an additional object to provide a construction which is designed for commercial production of shaped and formed units at relatively high speeds.

Other and further objects will appear as the description proceeds.

Certain preferred embodiments of the invention have been shown in the accompanying drawings, in which—

Figure 1 is an elevation of the machine in its housing;

Figure 2 is a cross section, on an enlarged scale, transversely of the feed conveyor;

Figure 9 is a front elevation, partly in section, of the assembly of Figure 8;

Figure 10 is a transverse view, taken on line 10—10 of Figure 9;

Figure 11 is a perspective view of a side pressure plate;

Figure 12 is a view generally similar to Figure 10, but showing the blank guiding elements in place;

Figure 13 is a section taken on line 12—12 of Figure 12;

Figure 14 is a fragmentary section taken on line 13—13 of Figure 12;

Figure 15 is an elevation of the central fluid supply column;

Figure 16 is a top plan view of the column of Figure 15;

Figure 3:
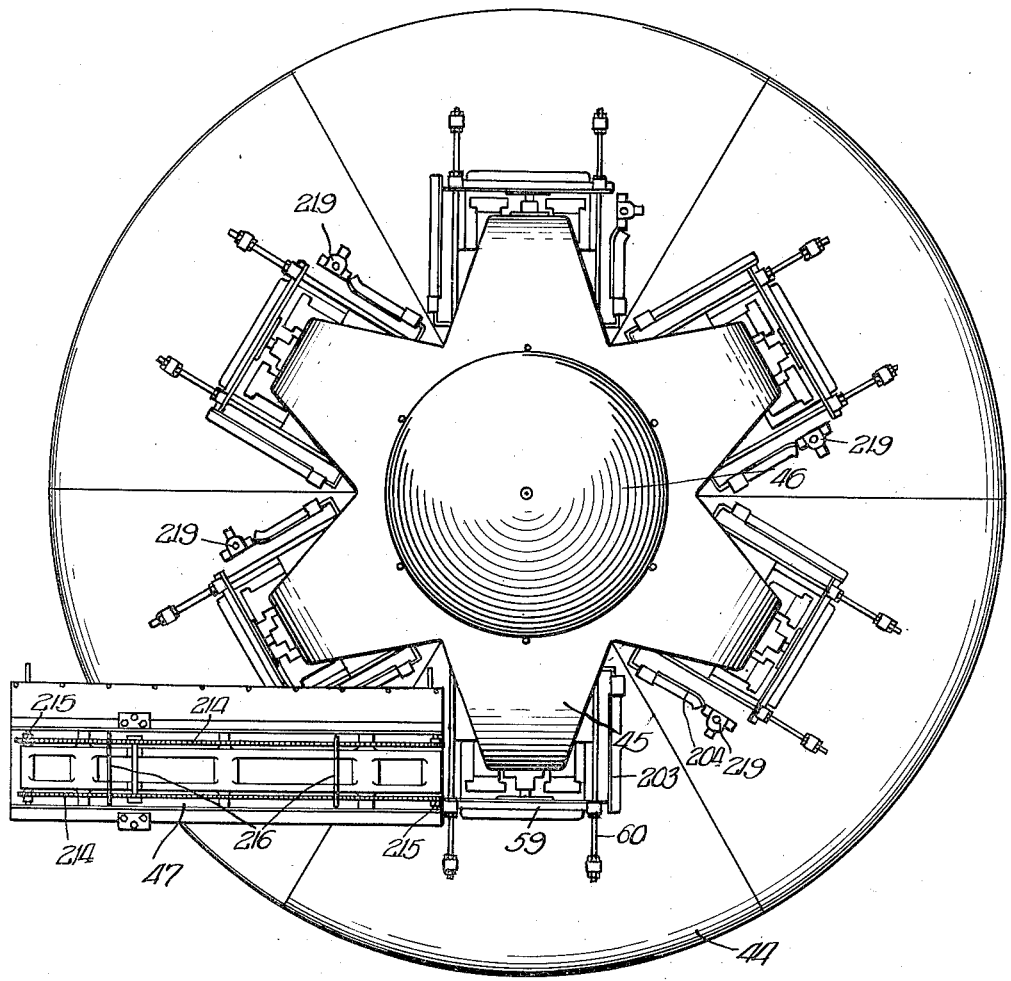
Figure 3 is a plan view of the machine of Figure 1.

Figures 17 to 31 inclusive are cross sections taken on lines 17—17 to 31—31 respectively of Figure 15;

Figure 32 is a bottom view of the column of Figure 15;

Figure 33 is a vertical section, partly in elevation, of a modified form of construction;

Figure 34 is a face view of a modified form of bottom pressure plate;

Figure 35 is a view of the plate of Figure 34, as seen from the right;

Figure 36 is a section taken on line 36—36 of Figure 34;

Figure 37 is a section taken on line 37—37 of Figure 34;

Figure 38 is a section taken on line 38—38 of Figure 34;

Figure 39 is a side elevation, partly in section, of the upper hydraulic control section of the column shown in Figure 33;

Figure 40 is a top view of the column section of Figure 39;

Figure 41 is a bottom view of the column section of Figure 39;

Figures 42 to 49 inclusive are transverse sections taken on lines 42—42 to 49—49 inclusive of the column section of Figure 39; and Figure 50 is a diagrammatic showing of the vacuum drain system for the piston glands.

The form of construction shown comprises six separate operating heads carried by a central hexagonal column, although it will be understood that the invention is not limited to this number of heads or this form of column. The external appearance of the entire machine is shown in Figure 1. The base 41 is provided with a plurality of feet 42 which have a screw adjustment so that the base may be accurately leveled. The bottom portion 43 carries the power supply apparatus and is fixedly supported on the base 41. The rotating table 44 is formed in six segments, each of which includes upper operating mechanism housed in the shells 45. The top of the assembly is housed in the hood cap 46. The feed conveyor 47 extends over the table 44, this conveyor being supported by means, not shown, independently of the carton forming apparatus.

Figure 7:
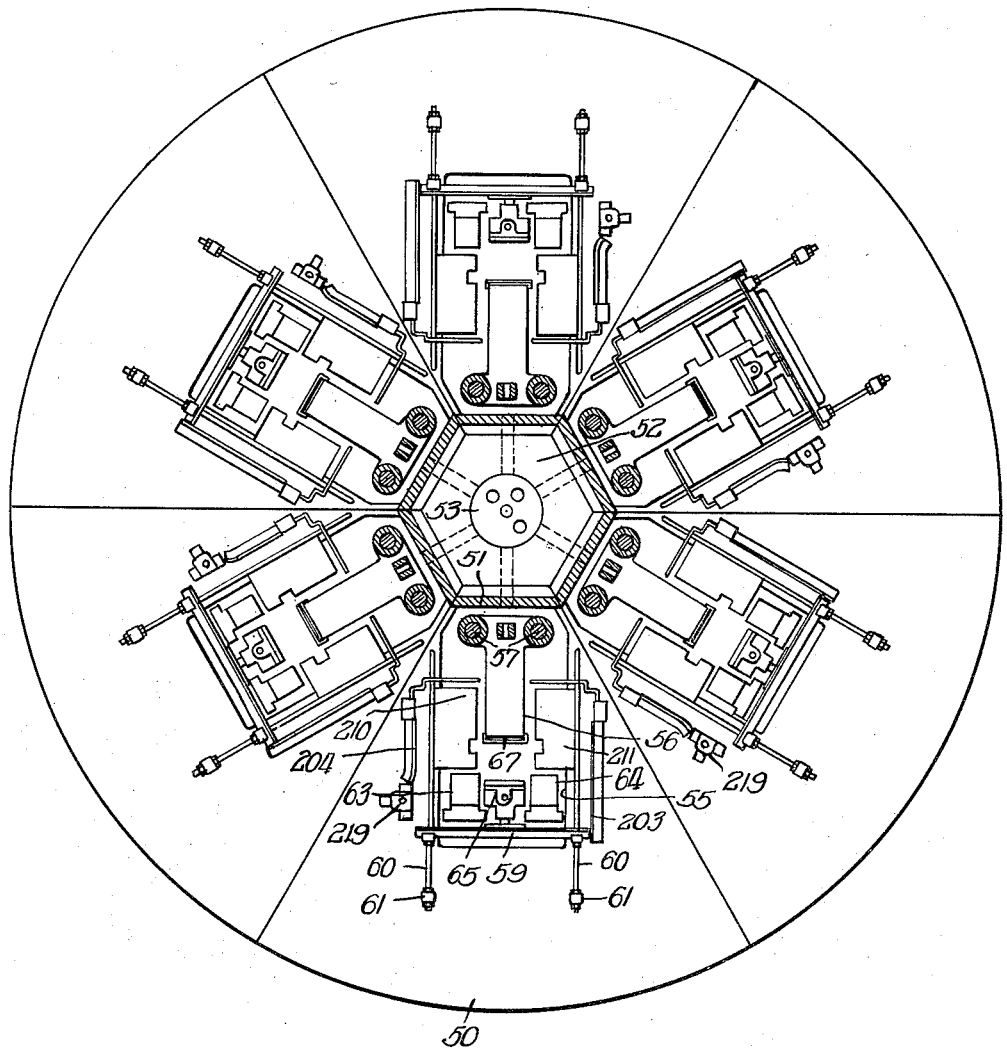
Figure 7 is a transverse section taken above the operating table, looking downwardly.

Referring next to Figures 7 and 10, which are sections taken on line 10—10 of Figure 9, Figure 7 shows the entire table top, while Figure 10 shows one of the six table sections on an enlarged scale. In Figure 7, each segment 50 has a vertical frame member 51 by means of which it is secured to the rotating outer hexagonal member 52 of the rotary valve which includes the cylindrical fixed valve column or pintle 53. This valve column 53 is provided with a plurality of related ports and passages which will be described hereinafter in connection with detailed figures.

Each segment 50 has a radial recess or carton forming chamber 55 adjacent its inner end. The mandrel 56 is guided by the vertical rods 57 and is moved upwardly and downwardly in the operation of the apparatus. The loader 59 is carried on rods 60 which extend from vertical arms 61 by means of which the loader is moved radially of the segment 50, toward and away from the mandrel 56. As shown in Figure 10, the side pressure plates 63 and 64 are located in the recess 55 adjacent either side of the mandrel 56. The bottom pressure plate 65 is also in recess 55 and is reciprocated into and out of engagement with the end 66 of the mandrel 56.

In Figure 10, the bottom tucker 67 is shown in the bottom of recess 55 adjacent the end 66 of mandrel 56. The side tuckers 68 and 69 are shown as carried by the side pressure plates 63 and 64 respectively.

Figure 8:
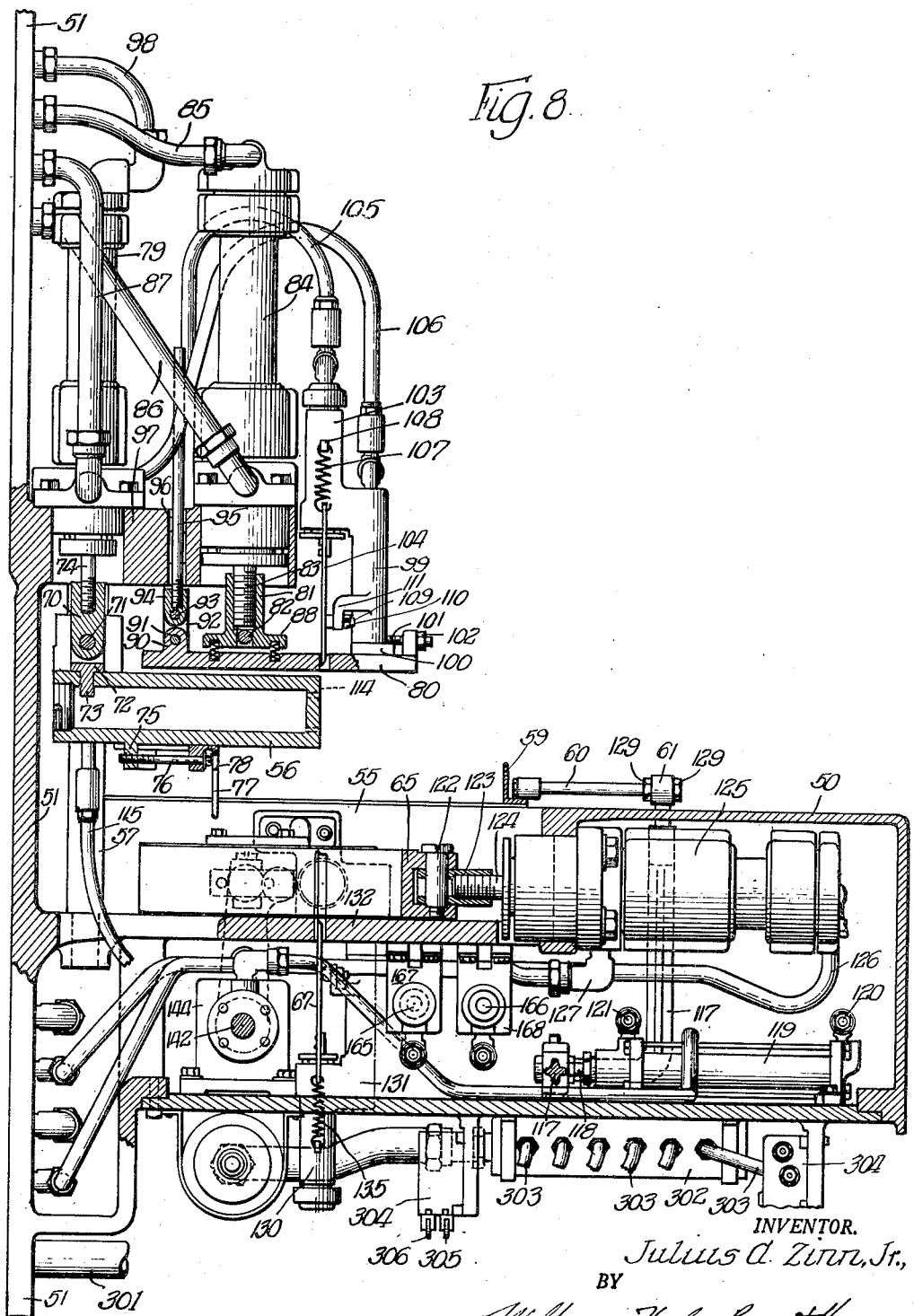
Figure 8 is a side elevation, partly in section, on an enlarged scale, showing a single operating assembly.

The operating mechanism of the several sections is shown in detail in Figures 8, 9 and 10. The mandrel 56 is reciprocated by means of piston rod 74 which is connected to a piston head fitting in the fluid pressure cylinder 79. The fluid under pressure for the upward stroke enters the lower end of the cylinder through tubing 87, while pressure for the downward stroke enters the upper end of the cylinder through tubing 98. The piston rod 74 is threaded into the member 70 which fits about the pin 71 carried by clevis 72 having a stud 73 extending into and secured to the mandrel 56. The lower face of the mandrel 56 is provided with a lug 75 into which is threaded an adjusting screw 76. This adjusting screw 76 serves to position the depth stop 77 which is fitted against the under face of the mandrel 56. As shown at 78, the member 77 is provided with an opening through which the location of the depth stop may be adjusted by means of turning the screw 76. This depth stop 77 serves to stop the inward movement of the carton blank, or its movement to the left as seen in Figure 8, when the blank is moved inwardly by the loader 59.

The top pressure plate 80 is connected to member 81 by pin 82, this member 81 being threaded onto the end of the piston rod 83 operating in cylinder 84. Fluid under pressure for the downward movement of rod 83 enters the upper end of cylinder 84 through tubing 85, while fluid under pressure for the upward movement of the rod 83 enters the lower end of cylinder 84 through tubing 86.

The pin 82 serves to permit limited pivotal movement of the pressure plate 80 about its support and it is yieldingly held substantially horizontal by the springs 88 fitting into recesses in the plate 80 and member 81. The rear portion of the plate 80 has an upwardly extending lug 90 which is connected by pin 91 and links 92 to pin 93 carried in member 94 on guide rod 95. The guide rod 95 is guided by bushing 96 fitted in an opening in the shelf 97 which supports the cylinders 67 and 84.

The outer end of the pressure plate 80 carries the bracket 99 which may be adjusted to the right and left, as seen in Figure 9, in the guide gibs 100 by adjusting screw 101 and lock nut 102. The bracket 99 carries the upper tucker cylinder 103 which carries a piston and piston rod connected to the upper tucker blade 104. Fluid under pressure for the downward movement of the tucker blade 104 enters the upper end of cylinder 103 through tubing 105. Fluid pressure for the upper or return movement of the tucker blade 104 enters the lower end of cylinder 103 through tubing 106. A pair of tension springs 107 have their upper ends connected to lugs 108 on opposite sides of cylinder 103. The lower ends of these springs are connected to the tucker blade 104. These springs serve to retract the tucker in the event of failure of the fluid pressure and during normal operation serve to facilitate the upward movement. A pair of adjusting studs 109 equipped with lock nuts 110 are carried on arms 111, one of which extends from each side of bracket 99. These studs 109 engage the face of the tucker blade 104 and serve, in co-ordination with the adjustment of the location of the bracket 99 in the gib 100, to exactly locate the plane of movement of the tucker blade 104 so that it clears the end of the mandrel 56 by the proper distance, depending upon the thickness of the material being formed thereon.

The mandrel 56 has its free end provided with a plurality of perforations 114, as best shown in Figure 8, and its interior is connected through tubing 115 with a source of air under pressure. This air under pressure is admitted by valve means actuated at the proper time in the cycle of operation to blow off the completed carton.

As shown in Figure 8, the loader arms 61 extend downwardly within the table segment 50 and are connected to yoke 117, which yoke is connected to piston rod 118 operating in cylinder 119. The location of the loader 59 relative to the arms 61 is adjusted by lock nuts 129. Fluid under pressure for inward movement of the loader enters the outer end of cylinder 119 through tubing 120 and fluid under pressure for the reverse movement of the piston enters the opposite end of the cylinder through tubing 121.

The bottom pressure plate 65 is connected by pin 122 to the fitting 123 carried by the end of the piston rod 124 operating in the cylinder 125. Fluid under pressure for the inward movement of the member 65 enters the right end of the cylinder through tubing 126 and fluid under pressure for the reverse movement enters the opposite end of the cylinder through tubing 127. As shown in Figure 10, the bottom pressure plate 65 is permitted to rock to a limited extent about the vertical axis formed by pin 122, this rocking being limited by compression springs located at 128. These springs are similar to the springs 88 in the upper pressure plate as previously described and shown in Figure 8.

The bottom tucker 67, as shown in Figure 8, is reciprocated by a piston carried in cylinder 130, which cylinder is supported on bracket 131 extending downwardly from the under face of the floor 132 of the recess 55. The bracket 131 is supported and adjusted in the same manner as bracket 99 for the top tucker which has been described in detail. As shown in Figure 9, fluid under pressure for upward movement of the bottom tucker is supplied to cylinder 130 through tubing 133, while fluid under pressure for the opposite movement is supplied through tubing 134. As shown in Figures 8 and 9, the bottom tucker 67 is provided with return springs 135 similar to the return springs 107 of the top tucker.

Referring now to Figures 9 and 10, the side pressure plate 63 is moved inwardly and outwardly by rods 140 carried by the lever arm 141 adjustably secured to piston rod 142 by nut 143. Piston rod 142 fits in one end of the duplex cylinder 144. The other end of the duplex cylinder 144 carries the piston rod 145 which, by means of lever arm 146 and rods 147, moves the right pressure plate 64. The duplex cylinder 144 comprises a single cylinder with two pistons operating outwardly from the middle of the cylinder. The fluid under pressure is fed to the middle of the cylinder between the two pistons to cause their simultaneous outward movement. The inward movement of the pistons is caused by fluid under pressure fed to the cylinder adjacent its ends. This feed is through a single divided passage so that operation in this direction is also simultaneous.

As has been previously described, the side pressure plates 63 and 64 carry the side tuckers 68 and 69. They also carry the operating mechanism for these tuckers, which mechanism in the form shown is very similar to that used in the operation of the top tucker 104 previously described. As shown at the lower left portion of Figure 9, the left side tucker 68 is actuated by a piston contained in cylinder 148, this cylinder being carried by bracket 149. The fluid under pressure for inward movement of the tucker enters through fitting 150 and for outward movement of the tucker enters through tubing 152. The tucker 68 is provided with return springs 153. The operating mechanism for the right-hand tucker 69 comprises a similar cylinder 154, shown in broken lines in Figure 10. Cylinder 154 is carried by bracket 155. Brackets 149 and 155 for these two side bottom tuckers are carried by the side pressure plates 63 and 64 and are adjusted by means of screws 156 and 157, respectively, in the same manner as the similar mechanism shown in Figure 8 for location and operation of the top tucker 104.

Members are provided fitting over the top of the side pressure plates 63 and 64 for folding the uppermost side body walls of the carton about the upper face of the mandrel. This mechanism is best shown in Figure 9 and the folding slide 158 is connected by screws 159 to a supporting member 160 secured to arm 161. A similar arm 162 operates the top body folder 169 on the right side. The arms 161 and 162 are connected by vertical rods 163 and 164 to piston rods 165 and 166. These piston rods 165 and 166 are reciprocated by means of pistons carried in the cylinders 167 and 168 which are provided with suitable connections for entry and discharge of the fluid under pressure, as shown in Figure 8.

The construction of a modification of the bottom pressure plate 65 is shown in detail in Figures 34 to 38 inclusive. It is important that all lateral areas of the carton be fully pressed against the mandrel 56 during the forming of the bottom. It is also important that the full area of the bottom be covered by the pressure plate assembly. Due to slight variations in the thickness of the cardboard forming the carton, the movement of the side pressure plates 63 and 64 may vary so that the distance between those plates will not always be constant when they have reached their inward limit of movement. The same is true of the downward movement of the top pressure plate 80 since its downward movement is limited not merely by the vertical depth of the mandrel 56 which is constant, but also by three thicknesses of the board forming the carton. There is one thickness below the mandrel 56 and two plies folded over each other above the mandrel. The side pressure plates 63 and 64 and the top pressure plate 80 extend beyond the bottom of the mandrel and the bottom pressure plate assembly 65 must fit closely between them and the floor 132 of the recess 55.

The bottom pressure plate assembly 65 is therefore formed to adjust automatically its pressure area to cover the variation in bottom area caused by different thicknesses of board used in the carton. It is particularly important that the pressure against the bottom come fully against the outermost bottom edges of the carton to insure sharp, clean edges without bulges or pinched portions.

The bottom pressure plate assembly 65, therefore, includes the body member 170 with the rearwardly extending portions 171 and 172 to receive the pivot pin 122. The four contact members 173, 174, 175 and 176 are slidably carried upon the face of member 170. As shown in Figures 36 and 37, the lower contact members 173 and 174 are carried on the dovetail guide 177 which is fastened to the body member by screws 178. The stop pins 179 and 180 are carried by the body member 170 and fit in grooves 183 and 184 in members 173 and 174, respectively, to limit separating movement of the members. The compression spring 185 is fitted into opposed recesses in contact members 173 and 174, as best shown in Figure 36, and urges them to their outward limit of movement as limited by stop pins 179 and 180, or as limited when assembled in the machine by engagement of members 173 and 174 with the inner faces of the lateral pressure plates 63 and 64, when these plates are moved inwardly in forming the carton about the mandrel 56. It will be understood that these contact members 173 and 174 rest on the floor 132 of the forming chamber 55 and will always positively contact that floor so that they need no vertical play or adjustability.

The upper contact members 175 and 176 slide on the diagonal dovetail guides 186 and 187 respectively, these guides being held to the body member by screws 188 and 189. Limit or stop pins 190 and 191 are provided fitting in grooves 192 and 193 in the members 175 and 176 respectively. Compression springs 194 and 195 are fitted into facing recesses between contact members 174 and 175 and contact members 173 and 176, respectively, and serve to urge the members 175 and 176 upwardly to their limit of movement. These springs 194 and 195 have no effect on contact members 173 and 174 which are held against vertical movement.

The compression spring 196 is fitted in opposing recesses in contact members 175 and 176 and urges them laterally apart. It will be apparent that the combined thrust of springs 194, 195 and 196 urge the contact members 175 and 176 diagonally upward and outwardly along the guides 186 and 187. Thus, the sides of members 175 and 176 will always engage the side pressure plates 63 and 64 and the tops of members 175 and 176 will always engage the underface of the top pressure plate 80 when the bottom pressure plate assembly 65 is in place in the machine.

There will be a small area in the form of a cross, as shown in Figure 34, between the adjacent edges of members 173 to 176 inclusive over which there will be no contact between the bottom pressure plate and the carton bottom, but with normal thicknesses of board this will be but a few thousandths of an inch wide. This small area across the center of the bottom causes no difficulty. The important feature is that all edges and corners are fully held and pressed to form cartons accurately sized and with square, solid corners and edges.

Figure 11 is a perspective view showing the details of the side pressure plates. Plate 64 is shown, but plate 63 is identical in design, being merely reversed in position. The member is cut away at 351 immediately around the opening 352 through which the side tucker 69 passes. The main body of the member 63 is of full thickness, as shown, and provides a flat face covering the entire side of the body of the carton when it is folded about the mandrel 56. This bearing surface extends to the opening 352 for the tucker blade 69. The purpose of the cut away portion 351 is to prevent distortion or mutilation of the side folds or tabs of the bottom. The upper and lower bottom tabs are folded down and up before the side tabs are simultaneously folded inwardly by the tuckers 68 and 69. The cut away portions 351 on the two side plates 63 and 64 permit the side tabs to swing outwardly while the top and bottom end tabs are folded and thus avoids deformation of the side tabs during these operations.

In the operation of the machine the blanks 200, shown in broken lines in Figure 12, are delivered in front of the loader 59. These blanks are delivered at a linear speed which is substantially the same linear speed as that of the portion of the rotating forming mechanism upon which they are delivered. The blanks 200 are dropped upon the rails or ridges 201 and 202 which are located upon opposite sides of the forming chamber 55. The table is rotated in the counter-clockwise direction and the conveyor brings the blanks in from the left, as seen in Figure 3.

The details of the conveyor, generally designated 47, form no part of the present invention and any known feeding means may be used provided it supplies blanks at substantially the linear speed of the rotating blank receiving portions. This is important, as the rotation of the machine is continuous.

Figure 4:
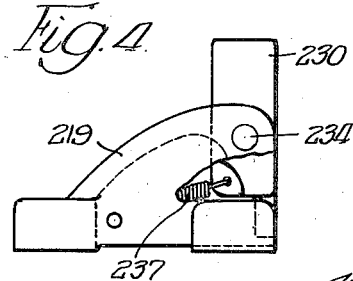
Figure 4 is a fragmentary view, on an enlarged scale, showing the blank pickup finger.
Figure 5:
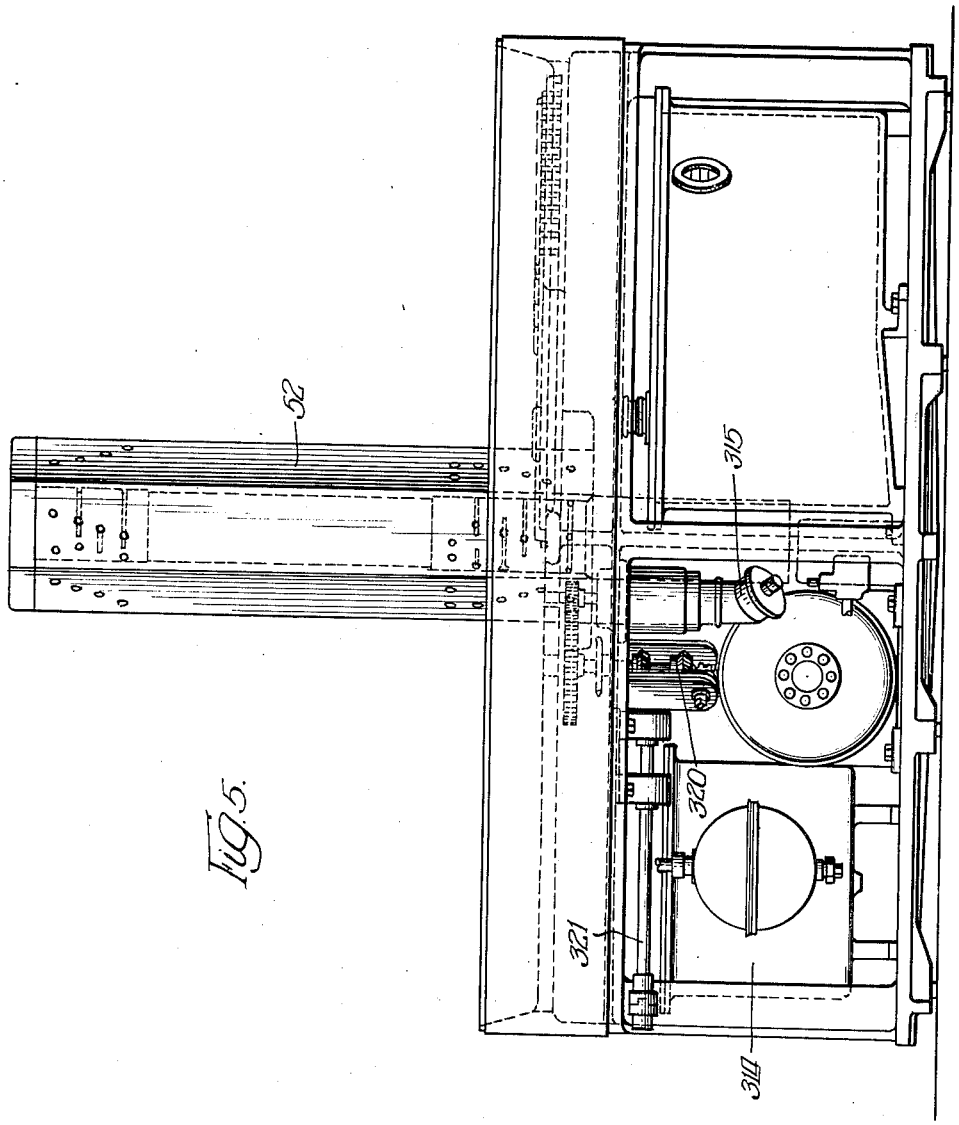
Figure 5 is an elevation of the main base and central column assembly with the operating elements removed from the column.

The conveyor shown comprises continuous chains 214 carried by sprockets 215. These chains move pusher members 216 slotted at 217 to pass over the rails 218, on which the blanks are moved by the lower pass of the conveyor. The transfer members 219 are shown in detail in Figure 4, and carry the fingers 230 pivoted at 234 and normally held in the vertical position by the tension springs 237. This method of support permits the fingers 230 to swing in the counter-clockwise direction as seen in Figure 4, to pass under the sides of the conveyor and to snap upwardly to engage the blanks to move them from the conveyor rails 218 to the machine rails 201 and 202 in front of the loader 59.

The blanks are dropped upon rails 201 and 202 and the leading edge of the moving blank engages the right hand blank guide 203, shown in Figures 12 and 13. The loader 59 moves the blank 200 forward and the left end of the blank passes the curved end 204 of the left hand blank guide 205 and is exactly centered as it moves forward to a position under the mandrel 56. Its forward movement is stopped by engagement of the blank with the stop 77 carried by the lower face of the mandrel 56. As the blank 200 engages the stop 77, it also engages the rear plows 206 and 207. In the specific form of construction shown, the guides 203 and 205 and plows 206 and 207 are adjustably secured to the top of the table section 50, as clearly shown in Figure 12.

The guides 208 and 209 for the bottom or radially outward edge of the blank are adjustably secured in place in the bottom of the chamber 55. The curved side folding guides 210 and 211 are secured to the table 50 adjacent the chamber 55 and extend over the side portion of the chamber above the side pressure plates 63 and 64 and top body folders 168 and 169. These pressure plates and top body folders are omitted from Figure 12 for the sake of clearness. These guides 210 and 211 are cut away at 212 and 213 to permit the movement of the top body folder mechanism as the side pressure plates 63 and 64 move against the sides of the mandrel 56. It will thus be apparent that the blank is accurately guided on all four edges and exactly located under the mandrel so that the score lines for folding are in the desired positions. At the time the mandrel contacts the blank it is held in position by stops 77, 206 and 207 and the loader 59. As the blank is forced into the well 55, it is guided by folding guides 210 and 211 and stops 77, 206 and 207 and guides 208 and 209. It will be understood that the conveyor and the table carrying the mandrel and associated parts are both continuously moving in synchronism, a blank being fed to each mandrel as it passes the conveyor end.

The valve column 53 is shown in detail in Figure 15 and sections showing the various port arrangements are shown in Figures 17 to 31, inclusive. It will be understood that these ports co-act with ports in the rotating outer member 52 to which the several operating elements and their ports and tubing connections are secured. The outer member 52 rotates in the counter-clockwise direction about the column 53, as viewed from above. The top of column 53 is shown as seen from above in Figure 16 and all of the sectional views, Figures 17 to 31 inclusive, are also shown as seen from above.

Figure 16 is a top view of the valve column 53. The column is provided with a plurality of passages extending throughout its length. These are the lower pressure fluid passages 221 and 222, the high pressure fluid passages 223 and the fluid return or drain passage 224. Small grooves 225, 226 and 227 are formed on the top surface leading from the high and lower pressure passages to the return passages so as to prevent accumulation of leakage oil and return it to the system.

Figure 17 shows a section through an upper tank return drain groove 228, a small passage 229 leading from the groove to the return passage 224. This takes care of any excess fluid which may work its way over the outer edge of the top of the column. This figure also shows an identical section through a lower tank drain, there being two lines 17—17 on Figure 15.

Figure 18 is a section through the passages leading to the upper end of the cylinder 79, operating the mandrel 56 as shown in Figure 8. The passage 231 leads from low pressure passage 221 to a circumferentially elongated port 232. This communicates through ports in the member 52 and plate 51 to pipe 98 leading to the top of cylinder 79. The transverse return passage 233 leads to the main return passage 224. This porting arrangement works in direct combination with that of Figure 22 described below.

Figure 19 is a section through a high pressure balance groove. The fluid pressures used in the machine may be on the order of two or three hundred pounds per square inch in the low pressure passage and from seven hundred to a thousand pounds pressure on the high pressure areas. If such pressures were merely applied on the port areas used in machine operation, the unsymmetrical location of such ports necessary to carry out the predetermined cycle of operations would cause a serious unbalance of pressures about the center pintle or valve column. In order that the machine may rotate smoothly about the column, it is necessary that the pressures be substantially balanced throughout the circumference of the column. Thus, as shown in Figure 19, the horizontal passage 235 leads high pressure fluid to the arcuate groove 236 from the high pressure supply passage 223. There is no return from groove 236, as this pressure is applied constantly.

Figure 20 shows the fluid supply and return passages which lead to the upper end of the top pressure plate cylinder 84 of Figure 8 through pipe 85. The horizontal passage 238 leads from the low pressure supply passage 221 to cause downward movement of the top pressure plate. The horizontal passage 239 leads from the high pressure passage 223 to the arcuate groove 240 which places the top pressure plate under high pressure. The drain groove 241 is connected by horizontal passage 242 to the vertical drain passage 224. It carries off oil from the piston end of the cylinder through pipe 85. The operation is further described in connection with Figure 23.

Figure 21 shows a low pressure balance groove to counter-balance the operating low pressure feed grooves. This groove 243 is fed through horizontal passage 244 from the vertical low pressure passage 222. There is no return from the groove 243 as the pressure is applied constantly. It is to be noted that there are two similar grooves spaced vertically and, consequently, there are two lines 21—21 indicated on Figure 15.

Figure 22 shows the connections leading to the lower side of the mandrel cylinder 79 through pipe 87, as shown in Figure 8. There is a horizontal bore 246 leading from low pressure feed passage 222. A second horizontal bore 247 leads from low pressure passage 221 to feed groove 248. A horizontal drain passage 249 leads to the vertical drain passage 224. Groove 248 acts coincidentally with groove 232 of Figure 18 so that the piston of cylinder 79 will move downward differentially. This porting relation exists only long enough to assure completion of the stroke. Immediately thereafter, the co-acting ports in the rotating assembly are cut off and the rod side subsequently opened to tank by bore 249, the mandrel being then free to float into alignment when pressure is applied by the top pressure plate.

Retraction occurs as the co-acting ports of the rotating assembly line up with ports 246 (Figure 22) and 233 (Figure 18), at which time fluid under pressure flows through tube 87 to the rod end of cylinder 79. The exhaust fluid flows through tube 98 and passages 233 and 224 (Figure 18) to tank.

Figure 23 shows the passages leading to the lower side of the piston operating in cylinder 84, this fluid serving to raise the top pressure plate. The horizontal passage 251 leads from lower pressure feed passage 222 and communicates with a feed groove 252. The horizontal passage 253 leads from lower pressure feed passage 221. The collecting groove 254 leads through passage 255 to the vertical drain pipe 224. In this case, coincident action occurs at the ports and passages of Figures 20 and 23, first giving differential advance and then high pressure hold involving port 239 and groove 240, Figure 20. Advance involves ports 253 of Figure 23 and port 238 of Figure 20. Retraction involves ports 251 and groove 252 of Figure 23 and port 242 and groove 241 of Figure 20.

Figure 24 shows two portions of the member 53 at points indicated by lines 24—24 through sections taken through continuous circular grooves 257 which are connected through horizontal passages 258 to the vertical drain passage 259. These grooves 257 co-act with passages in rotating member 52 which are connected by branch pipes of small diameter to the packing glands about the pistons of the various operating cylinders. The grooves are under vacuum and this vacuum, in the various branch pipes, serves to draw off any fluid which may leak into the glands around the piston rods from the piston rod sides of the cylinder. By this means, all leakage of fluid out of the glands is prevented and no fluid can work into the carton forming mechanism or onto the blanks being handled by the machine. This is important, as it prevents spotting or damage of any blanks by fluid leakage. This action is described more in detail in connection with Figure 50.

Figure 25 is a section taken through the feed to the side pressure plates 63 and 64 of Figure 10. The horizontal passage 261 leads from the vertical low pressure passage 222. The horizontal passage 262 leads from the vertical low pressure passage 221 and communicates with the arcuate feed groove 263.

Figure 26 is a section through the feed port of fluid to the bottom pressure cylinder 125, which port feeds to the outer end of the cylinder through pipe 126 to cause the pressure stroke. The low pressure feed passage 265 leads from the vertical low pressure passage 221 to the feed groove 266. This serves to provide sufficient fluid for movement of the piston in the cylinder. Fluid for holding the bottom pressure plate 65 against the bottom of the formed carton under high pressure is led through horizontal passage 267 from the high pressure feed passage 223 to the arcuate feed groove 268. The arcuate return groove 269 leads through passage 270 to the vertical drain passage 224.

Figure 27 is taken through the lower high pressure balance groove 273. This groove is fed from the high pressure feed passage 223 by means of the horizontal passage 274.

Figure 28 is taken through the passages controlling the return stroke of the side pressure plates. This shows the horizontal passage 276 leading from the vertical low pressure feed passage 222. The drain groove 277 communicates through horizontal passage 278 with the vertical drain passage 224.

Figure 29 is a section taken through the low pressure balance located toward the bottom of the column. The balance groove 280 is connected by passage 281 to the vertical low pressure feed passage 222. As is the case with the other pressure balancing grooves, there is no return from this groove.

Figure 30 shows the passages controlling fluid flow to the left or return side of the bottom pressure plate cylinder 125. This connection is through pipe and fitting 127. The vertical low pressure feed passage 222 is provided with fluid by horizontal feed passage 283. The other low feed passage 221 is provided with the horizontal passage 284. The arcuate return groove 285 is connected by horizontal passage 286 with the vertical return passage 224.

Figure 31 shows a section taken through the passages for supplying air under pressure for operating the tuckers and blowing the finished cartons from the mandrel. The vertical air pressure supply passage 288 is connected by horizontal passage 289 to the circumference of the column. The passage 289 feeds air to a continuous circumferential groove in the hexagonal member 52 which feeds air continuously through pipes 301 to the manifolds 302 on the six operating assemblies.

Figure 32 is a bottom view of the column showing the securing flange and also showing the several vertically extending passages in the column.

The description given above of the various hydraulic passages and ports in the cylindrical pintle covers the flow of fluid under pressure for operating the mandrel, the top pressure plate, the side pressure plates and the pressure plate operating against the bottom of the mandrel. In the first form of construction shown, all of these elements are operated by liquid pressure. This form of construction so far described operates the various tuckers by air pressure. These comprise the bottom tucker 67, the side end tuckers 68 and 69, the top end tucker 104 and the top body folders 158 and 169, as shown in Figure 10.

Referring now to Figures 8 and 9, the air under pressure is introduced through pipe 301 from the central column. This pipe is connected to the manifold 302 which, in turn, is connected by the tubing units 303 to the various cam operated valves 304. These various valves are duplex valves of any standard construction and need no specific description. Each valve carries a pair of rollers 305 and 306, the upward movement of roller 305 serving to permit passage of air to an actuating cylinder and a similar lift of roller 306 serving to admit air to the opposite side of the return piston in the cylinder for the return movement. These valves are connected by tubing to the operating cylinders for the several tuckers and folders as above described.

As an example, one such valve is connected to tubing 105, shown in Figure 8, to admit air under pressure to the upper side of the piston in cylinder 103 to operate the top end tucker 104. The other side of the same valve is connected to tubing 106 for effecting the upward movement of the tucker 104. The operating cylinders for the other tuckers and folders are similarly controlled.

This air pressure also operates the loader 59 by means of air introduced into the opposite ends of cylinder 119 through connections 120 and 121. The various valves 304 of each unit are located at different distances radially outward from the center of rotation of the machine assembly.

A single valve controls flow through tubing 115 to admit a blast of air to the interior of mandrel 56 at the time in the cycle when it is desired to blow the completed carton from the mandrel.

Figure 6:
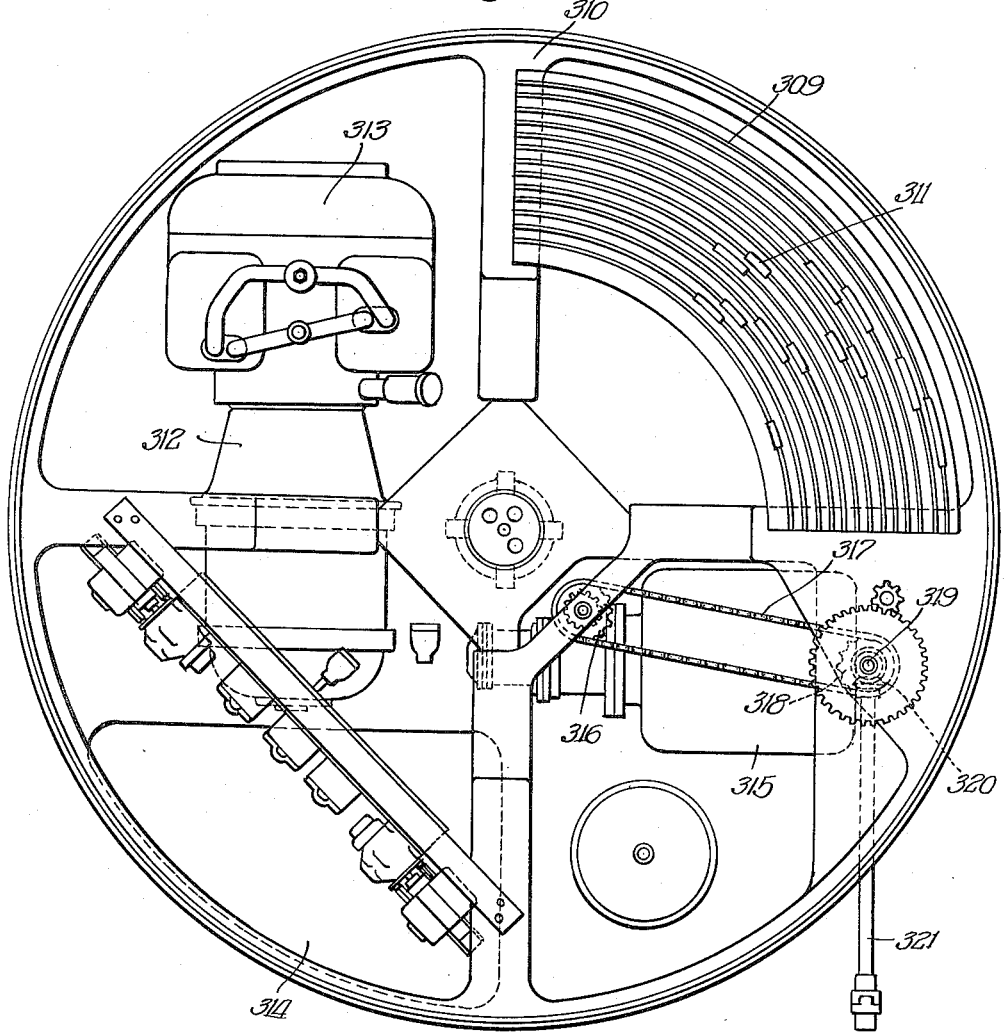
Figure 6 is a plan view, partly broken away, showing the elements of Figure 5.

As shown in Figure 6, there are a plurality of circular tracks 309 carried by the upper portion of the fixed face 310 of the apparatus. While Figure 6 shows only a 90° arc of these tracks, it will be understood that the tracks may extend throughout the circle or throughout that portion of the circle where any movement of the tuckers takes place. These tracks 309 carry lifting cams 311 which are located at different points on the track corresponding to the point in the circular movement of the operating head at which the particular element controlled by the cam is desired to operate. These lifting cams 311 also vary in length to control the period of operation.

Figure 6 also shows, in general and diagrammatic form, the main elements of the apparatus carried in the base. The motor 312 drives the pump assembly 313 to provide the fluid under pressure for operation. The fluid tank 314 carries the fluid as it returns from the drain in the center column and fluid therefrom is led through pump 313 to return to the pressure passages. The hydraulic drive motor 315 serves to rotate the table carrying the operating units. This motor also, through sprocket 316, chain 317 and sprocket 318, serves to drive a vertical shaft 319. This shaft 319 is connected by beveled gearing, indicated at 320, to a horizontal shaft 321. This horizontal shaft 321 is connected to the drive of the feed conveyor 47, shown in Figure 3, and thus assures an exact timing relation between the movement of the feeder and the rotation of the table carrying the operating elements.

Figure 33 is a general showing of a modified form of construction in which all of the elements of the machine are operated by liquid pressure rather than partially by air pressure. An additional fixed cylinder section 325 is connected on the top of the central column 53. Certain of the liquid pressure openings and the drain opening in column 53 communicate with similar openings in element 325. Ports are provided in a supplemental housing member 326 to co-act with ports in valve column or pintle 325. This member 326 is secured at the top of member 52 and rotates with that member. The ports in the section 326 are connected by pipes (not shown) with the various cylinders for operating the tucker elements which are air operated in the other form of construction.

The upper pintle or column section 325 is shown in detail in Figure 39 and sections are shown in Figures 42 to 49 inclusive. None of the tuckers require high pressure liquid for operation and, consequently, this section is provided only with a central drain 361 which registers with the central drain 224 in the lower column section 53 and with a low pressure liquid passage 362 which registers with the low pressure passage 222 in the lower section 53.

Figure 42 shows a section taken on line 42—42 of Figure 39. Transverse passage 365 leads from the low pressure main passage 362 to a continuous circumferential groove 366. This groove 366 communicates through the short radial bore 367 to a short vertical passage 368 which extends down into the plane of the next section shown in Figure 43.

A number of the cylinders controlled from the member shown in Figure 39 are differentially operated. They have their rod sides constantly connected to a source of liquid under pressure. The piston side is intermittently connected to liquid pressure when it is desired that the piston and rod move toward the rod end of the cylinder. The pressures in pounds per square inch admitted upon opposite sides of the piston are the same. The effective area upon the rod side of the piston is less, however, than that on the opposite side of the piston by an amount equal to the cross sectional area of the rod. Thus, with equal pressures per square inch on both ends of the cylinder, there is movement of the piston toward the rod end. When pressure is released from the piston end of the cylinder, the constant pressure on the rod side of the pistons causes it to move in the reverse direction.

This differential method of operation insures smooth and efficient cylinder operation. It avoids the necessity for synchronizing ports leading to the opposite ends of the cylinders, since it is only necessary to control the fluid feed to the piston end of the cylinder and its release from that end.

The cylinders which are differentially operated in this form of construction are the loader cylinder 119, left body folder cylinder 167, right body folder cylinder 168, upper bottom flap cylinder 103, lower bottom flap cylinder 130, left bottom tucker cylinder 146 and right bottom tucker cylinder 154.

All of these cylinders, which are differentially operated, are continuously provided with fluid under pressure from the groove 366 of Figure 42. While this has been shown and described as liquid, it will be clear that these cylinders may be operated pneumatically by this form of control instead of by the cam and valve form of control as shown in Figures 8 and 9, if desired.

Figure 43, which is a section on line 43—43 of Figure 39, shows the ports controlling flow of fluid to the piston side of the right and left bottom tucker cylinders 154 and 146. These cylinders are connected in parallel, as these two tuckers operate simultaneously. The fluid flows from vertical bore 368 through the radial passage 370. The fluid in the piston ends of these cylinders is released through the circumferential groove 371 which is connected by passage 372 to the drain 361.

Figure 44 shows the ports controlling the fluid flow to the piston end of the lower bottom flap cylinder 130. Fluid under pressure flows from passage 362 through passage 374. Pressure is relieved through groove 375 connected by port 376 with drain 361.

Figure 45 shows the ports controlling the fluid flow to the piston end of the upper bottom flap cylinder 103. Fluid under pressure flows from passage 362 through passage 378. Fluid is returned through groove 379 and passage 380 to the drain 361.

Figure 46 shows a balance port and groove,

Fluid under pressure passes through passage 382 from the fluid supply passage 362 to the balancing presure groove 383. This serves to balance pressures against the walls of the housing 326.

Figure 47 shows the passages which control the supply of fluid pressure to the piston end of the right body folder cylinder 168. Fluid under pressure flows through passage 385. It is returned to drain 361 through groove 386 and passage 387.

Figure 48 shows the passages which control the supply of fluid pressure to the piston end of the left body folder cylinder 167. Fluid under pressure enters through passage 389 and is released to drain 361 through groove 390 and passage 391.

Figure 49 shows the passages which control the supply of fluid pressure to the piston end of the loader cylinder 119. Fluid under pressure enters the cylinder from passage 393. It returns to drain 361 through groove 394 and passage 395.

As shown in Figures 33 and 39, a ball bearing 397 is fitted on the top of the member 325. This bearing serves to support the entire rotating assembly including the operating heads. This bearing is adequately lubricated by leakage of the operating fluid.

As shown in Figure 33, the lower end of the hexagonal member 52 carries the ring gear 398 driven by small gear 399. This gear 399 is on the same shaft as a gear 401 which is driven by gear 402, the latter gear being keyed to the shaft of the hydraulic motor 403. A sprocket 405 located between gears 399 and 401 drives sprocket 406 through a chain connection. Sprocket 406 drives shaft 408 which carries a bevel gear 409. The blank feeding conveyor 47, shown in Figures 1 and 3, is driven by this gear 409.

In the description of the method of operation of the machine, only one of the six heads shown need be described since all heads are identical and operate through the same cycle. It is only necessary, therefore, to describe the action of the several elements of one head as that head rotates throughout a complete circle in its movement about the pintle.

In the following description, the carton blank and carton are considered as viewed radially from the outside of the machine looking toward the pintle, the right and left hand relationship of the parts being based on this point of view.

It will be understood that the following description of the cycle of operation of the form of construction which is completely actuated by liquid pressure applies equally well to the first form of construction described in which certain of the elements are operated by pneumatic pressure.

With the machine in operation, the complete upper portion of the machine carrying the six heads is rotating in the counter-clockwise direction about the pintle, as viewed from above, as shown for example in Figures 3 and 7. Referring to Figure 3, the lower left sector has reached the zero point with the mandrel raised so as to clear the conveyor 47. As this head whose operation is being described passes the zero point, all operations of a previous cycle are complete with the exception of the blow off of the completed carton from the mandrel, which is in its uppermost position. This blow off occurs simultaneously with the feeding of a new carton blank onto the rotating table 44 from the conveyor 47 which takes place as the sector passes under the conveyor 47 and is completed as the sector reaches the position of the lowermost sector as shown in Figure 3.

As the rotary motion of the head proceeds, fluid is directed to the head end of the loader cylinder 119, causing its piston and connected operating mechanism, including member 59, to move the blank into register position under the raised mandrel 56. Flow to the head end of this cylinder is through passage 393, shown in Figure 49. Retraction of the loader 59 is permitted by connecting the head end to the pressure drain through the arcuate groove 394 and passage 395 of Figure 49. Immediately after this loading operation, the mandrel piston will start down as fluid under pressure flows to the head end of the cylinder 79 through passage 231 and arcuate groove 232 in Figure 18. At the same time, fluid on the rod end of cylinder 79 will return into the low pressure manifold 221 through arcuate groove 248 and passage 247 in Figure 22. This will cause the mandrel cylinder 79 to operate differentially.

On completion of the mandrel stroke, the carton blank will have been forced downwardly so that its central portion is held between the mandrel 56 and the bottom 132 of the well 55. The members 210 and 211, shown in Figures 12 and 13, cause the right and left side body portions of the blank to be swung upwardly.

The next operation is that of the side pressure cylinder 144 which will move its pistons inwardly, forcing the side pressure plates 63 and 64 toward the mandrel. These plates force the side body portions of the carton against the mandrel 56 and the body portions which are to be overlapped upon the upper face of the mandrel will now extend vertically. The side pressure cylinder 144 is a duplex cylinder and fluid is directed to the rod ends in this folding action, side pressure occurring on the pull stroke of the pistons. This power or pull stroke also involves opening the head or piston ends of the duplex cylinder 144, located at the center of the cylinder, to the fluid drain through arcuate groove 277 and passage 278 of Figure 28.

On completion of the inward strokes of the side pressure plates 63 and 64, the piston in the left body flap cylinder 167 will move inwardly, folding the left body flap over the top of the mandrel. The piston in this cylinder 167 will immediately start its return stroke and, at the same time, the piston in the right body flap cylinder 168 will start moving its piston inwardly to fold the right body flap over the previously folded left body flap. The left cylinder 167 receives oil from the low pressure passage 389 shown in Figure 48. The return of the piston in this cylinder 167 is effected by immediately opening it to the drain by means of the arcuate groove 390 and passage 391 as shown in Figure 48. This is a differentially operated cylinder, and pressure is continuously applied to the rod end.

The right body flap folder 169 operates in the same manner, with fluid supplied and drawn off through the passages shown in Figure 47.

On completion of the body flap folding, the top pressure plate 80 will move downwardly, and it is timed to attain a position preventing the right body flap from springing back as the right body folder crosses the mandrel on its retraction stroke. The top pressure plate cylinder 84 receives fluid for this downward motion of plate 80 through passage 238, of Figure 20, connected to the head end of the cylinder and passage 253, shown in Figure 23, connected to the rod end of the cylinder, causing differential operation of the piston.

Immediately after completion of this downward stroke of plate 80, the head end of the cylinder 84 is sealed off from the low pressure fluid and opened to high pressure fluid through arcuate groove 240 and passage 239, shown in Figure 20. At the same time that high pressure is applied to the piston end, the rod end of the cylinder 84 will be opened to the oil drain through arcuate groove 254 and passage 255, shown in Figure 23. The carton body flaps will be forced against the upper side of the mandrel by the full cylinder pressure afforded by the high pressure fluid supply, thus insuring the desired adhesion of the glue or other adhesive used between the flaps.

Immediately after completion of this downward stroke of the top pressure plate, the piston in the upper bottom flap cylinder 103 will move the top tucker 104 to fold that flap downwardly and will instantly start returning to its upper position on completion of the fold. At the same time that the upper bottom flap tucker starts upwardly, the piston in the lower bottom flap cylinder 130 starts to force the bottom tucker 67 upwardly to fold the lower bottom flap upwardly against the first folded flap. This timing is such that the folding of the lower flap will prevent the springing back of the upper flap as the piston in cylinder 103 retracts. Fluid flow for cylinder 103 is through the passage 378, shown in Figure 45.

The return of the piston in cylinder 103 is effected by immediately opening the piston end of this cylinder to the oil drain by means of the arcuate groove 379 and passage 380, as shown in Figure 45. Pressure is continuously applied to the rod end of the cylinder 103.

Cylinder 130 operates in the same manner by means of fluid flow through the passages shown in Figure 44.

On completion of the folding of the lower bottom flap, both bottom side tuckers 68 and 69 will move inwardly simultaneously and must be timed so as to attain just enough fold to prevent spring back of the lower bottom flap as the lower bottom flap tucker 67 retracts on completion of the tucking operation.

As the side tuckers 68 and 69 begin retracting, the bottom pressure plate 65 must be timed to have attained a position to prevent spring back of the flaps as the tuckers continue to retract.

The side tucker cylinders 146 and 154 have pressure continuously directed to their rod ends. Differential advance of the pistons in these cylinders is effected by directing fluid to the piston ends through the low pressure passage 370, shown in Figure 43.

Retraction is accomplished by opening the piston ends to the oil drain through the arcuate groove 371 and passage 372, also shown in Figure 43.

Fluid under pressure for actuating the bottom pressure plate 65 flows through passage 265 and arcuate grooves 266, shown in Figure 26, to the piston end of the cylinder 125. At the same time, the rod end is open to fluid under the same pressure through passage 284, shown in Figure 30, causing the piston to advance differentially.

On completion of this inward stroke, both ends of the cylinder 125 are cut off from the source of low pressure fluid. Immediately thereafter, the piston end of cylinder 125 is open to high pressure fluid through passage 267 and arcuate groove 268, shown in Figure 26. At the same time, the rod end of cylinder 125 will be open to fluid drain through arcuate groove 285 and passage 286, shown in Figure 30. The bottom pressure plate will thus be forced against the formed bottom of the carton under the full pressure of the high pressure fluid. This insures proper forming of the bottom and proper adhesion of the bottom flaps.

The foregoing completes all of the forming and power operations. Those cylinders under high pressure, namely, the cylinder which operates the top pressure plate 80 and cylinder 125 operating the bottom pressure plate 65, will remain under high pressure until retraction is started. The sequence of retraction of the plates is that first the bottom pressure plate moves outwardly, next the side pressure plates move outwardly, then the top pressure plate moves upwardly, followed by the upward movement of the mandrel carrying the completed carton.

Fluid for the retraction of the bottom pressure plate 65 flows to the rod end of the cylinder 125 through passage 283, shown in Figure 30. The fluid exhausted from the piston end of cylinder 125 will return to the tank through the oil drain and arcuate groove 269 and passage 270, shown in Figure 26. During the time while the bottom pressure plate 65 is retracting, retraction of the side pressure plates 63 and 64 will start. Fluid for this retraction will flow to the center of the duplex cylinder 144 and to the opposed ends of the two pistons in that cylinder through passage 261, shown in Figure 25. The rod ends of cylinder 144 are connected to the fluid pressure at the same time through passage 276, Figure 28, the retraction being accomplished by the differential pressure areas.

Immediately after the bottom pressure plate and side pressure plates have cleared the mandrel, the top pressure plate 80 will start up with fluid directed to the rod end of the cylinder flowing through arcuate groove 252 and passage 251, shown in Figure 23. Fluid exhausted from the piston end of the cylinder will return to the tank through the arcuate groove 241 and passage 242, shown in Figure 20. As the top pressure plate 80 moves upwardly, the mandrel 56 will immediately follow. The mandrel movement is caused by flow of liquid under pressure to the rod end of the mandrel cylinder 79 through passage 246, shown in Figure 22. The fluid exhausted from the piston end of the cylinder 79 will return to the fluid drain through passage 233, shown in Figure 18.

It will be understood that the operating assemblies are identical so that a description of the operation of one applies equally to all six assemblies.

A schematic layout of the means for drawing off any leakage around the piston rods of the actuating cylinders is shown in Figure 50. The rod end of one such cylinder is shown at 451 with the piston rod 452. An inner gland member 453 carries a packing ring 455. An outer gland assembly 457 is held in place by bolts 458 and carries a packing ring 459. A chamber 461 surrounds the rod 452 between the glands. A passage 463 is connected by pipe 464 to the hexagonal member 52 and to a port 466 therein which is vertically aligned with the circumferential groove 257 in the pintle 53. This groove 257 communicates with the vacuum drain 259 through passage 258, as shown in Figure 24.

Pipe 468 leads past vacuum gauge 469 to the Venturi chamber 470. Fluid under pressure enters the Venturi chamber 470 from nozzle 472 at the end of the pressure line 473. Flow from the Venturi chamber passes through pipe 474 to the oil tank.

A portion of the oil pressure system is shown at the left of Figure 50. The motor 476 drives pump 477 which draws oil from the tank through line 478. Fluid under pressure passes from pump 477 through line 480 to relief valve 481. In the event of excess flow and pressure, the relief valve 481 diverts excess flow through line 483 to line 473 and thence back to the tank through the venturi.

Fluid under pressure flows in normal operation from relief valve 481 through line 485 to the control valve 486. Form valve 486 fluid is directed through line 488 to the hydraulic motor 403 which drives the rotating machine assembly or is diverted to 473. The exhaust oil from motor 403 passes through line 473 and thence to tank through the venturi. If the motor is to be stopped, shifting of valve 486 will divert the oil from pump 477 directly into line 473 through line 490 and thence to tank through the venturi. It will be noted that whether oil bypasses through relief valve 481 or whether motor 403 is idling or driving the machine, full pump delivery always passes through the venturi; hence, with constant flow, the vacuum remains constant under all circumstances. Line 491 from valve 486 leads to such other elements of the machine as may be operated by fluid pressure from pump 477.

It will be understood that Figure 50 is a schematic diagram and that a plurality of suction lines may be connected, as desired, to the member 52 through such piping and manifolds as are most convenient and efficient. Similarly, any desired Venturi structure may be used to provide a partial vacuum, the showing in the drawing being merely diagrammatic.

While certain forms of construction have been shown and described, they are to be understood to be illustrative only. The machine has been shown as forming rectangular cartons. It will be understood that the mandrel may take various forms and proportions with suitable modification of the several forming elements which co-act with the mandrel. Also, while the machine has been specifically shown for folding and forming cartons, it will be apparent that it is adapted for use in a wide variety of shaping and forming operations. Consequently, I contemplate such variations and modifications as come within the spirit and scope of the appended claims.

I claim:

1. In a forming machine, a table having a well with a fixed bottom, a mandrel, means for reciprocating the mandrel into and out of the well, means for feeding a blank to a point above the well and below the raised mandrel whereby downward movement of the mandrel forces the blank into the well, the mandrel holding a portion of the blank against the well bottom, means for forcing and holding side portions of the blank against the sides of the mandrel, means for folding portions of the blank against upper portions of the mandrel, means for holding said portions against the mandrel, means for folding bottom forming portions of the blank adjacent the bottom of the mandrel in the well, and means for forcing and holding the bottom forming portions against the mandrel.

2. In a forming machine, a table having a well with a fixed bottom, a mandrel, means for reciprocating the mandrel into and out of the well, means for feeding a blank to a point above the well and below the raised mandrel whereby downward movement of the mandrel forces the blank into the well, the mandrel holding a portion of the blank against the well bottom, reciprocating means in the well for forcing and holding side portions of the blank against the sides of the mandrel, reciprocating means in the well for folding portions of the blank against upper portions of the mandrel, vertically movable means for holding said portions against the mandrel, reciprocating means in the well for folding bottom forming portions of the blank adjacent the bottom of the mandrel in the well, and reciprocating means in the well for forcing and holding the bottom forming portions against the mandrel.

3. In a forming machine, a mandrel, means for folding a blank about the mandrel, and means for forcing folded portions of the blank against the mandrel and for holding said portions against the mandrel, and means for applying additional pressure to certain of said holding means for holding certain of said portions under said additional pressure.

4. In a forming machine, a mandrel having sides and a bottom end, means for folding a blank about the sides and end of the mandrel, the blank overlapping on a side area and the bottom area, means for forcing the blank side areas against the mandrel and holding them against the mandrel, and means for forcing the blank bottom areas against the mandrel while the side areas are held against it, said folding and forcing means being operated by pistons operating in cylinders and actuated by fluid pressure.

5. In a forming machine, a mandrel having sides and a bottom end, means for folding a blank about the sides and end of the mandrel, the blank overlapping on a side area and the bottom area, means for forcing the blank side areas against the mandrel and holding them against the mandrel, and fluid pressure operated means for forcing the blank bottom areas against the mandrel while the side areas are held against it and means for supplying additional fluid pressure to said fluid pressure operated means for holding the bottom areas against the mandrel bottom under said increased fluid pressure.

6. In a forming machine, a mandrel having sides and a bottom end, means for folding a blank about the sides and end of the mandrel, the blank overlapping on a side area and the bottom area, means for forcing the blank side areas against the mandrel and holding them against the mandrel, and fluid pressure operated means for forcing the blank bottom areas against the mandrel while the side areas are held against it and timed valve members for supplying fluid under increased pressure to the fluid pressure operated means for holding the bottom areas and overlapped side areas against the mandrel bottom under increased pressure.

7. In a forming machine for forming a carton from a blank having adhesive applied to overlapping portions thereof, a mandrel, means for folding the blank about the mandrel with the adhesive coated portions in overlapping relation, members for forcing the overlapped coated portions against the mandrel, said members retaining the blank in fixed position against the mandrel and means for applying additional pressure to said members and to said overlapped coated portions.

8. In a forming machine for forming a carton from a blank having adhesive applied to overlapping portions thereof, a mandrel, means for folding the blank about the mandrel with the adhesive coated portions in overlapping relation, fluid pressure operated means for forcing the overlapped coated portions against the mandrel, and means for applying additional fluid pressure to said fluid pressure operated means to cause an effective adhesion of said coated areas.

9. In a forming machine, a mandrel, fluid operated cylinders adjacent the mandrel, means forming an object about the mandrel, said means being operated by pistons and piston rods moving in the cylinders, and vacuum means for drawing off leakage from the cylinders about the piston rods.

10. In a forming machine, a mandrel, fluid operated cylinders adjacent the mandrel, means forming an object about the mandrel, said means being operated by pistons and piston rods moving in the cylinders, multiple glands about the piston rods at the rod end of the cylinders, and means for creating a vacuum between said glands.

11. In a forming machine, a mandrel, fluid operated cylinders adjacent the mandrel, means forming an object about the mandrel, said means being operated by pistons and piston rods moving in the cylinders, multiple glands about the piston rods at the rod end of the cylinders, and means for creating a vacuum between said glands, said means comprising a venturi a pump adapted to discharge fluid under pressure through said venturi to create a suction and a suction line connecting the low pressure area of the venturi and the space between the glands.

12. In a forming machine, a rotating table, a plurality of similar forming heads spaced about the center of rotation of the table, a blank feed conveyor supported independently of the table and extending over the table, and means carried by the table adjacent each forming head for removing blanks from the conveyor and positioning them adjacent the head.

13. In a forming machine, a table, means for rotating said table a plurality of similar forming heads spaced about the center of rotation of the table, a blank feed conveyor supported independently of the table and extending over the table, and means carried by the table adjacent each forming head for removing blanks from the conveyor and positioning them adjacent the head, the rotating table being continuously rotated and means connecting the table rotating means and the conveyor whereby the conveyor is synchronized with the table speed.

14. In a forming machine, a rotating table, a plurality of similar forming heads spaced about the center of rotation of the table, a blank feed conveyor supported independently of the table and extending over the table, the conveyor having upper means pushing carton blanks along lower guides and means carried by the table adjacent each forming head for removing moving blanks from the conveyor guides and positioning them adjacent the head.

15. In a forming machine, a rotatable table, a plurality of forming heads carried by the table spaced about the axis of rotation of the table, the heads comprising mandrels and forming means, fluid pressure cylinders for operating the forming means relative to the mandrels, and means for supplying fluid under pressure to the rotatable table, said means comprising fixed passages and ports and movable ports and passages carried by the table co-acting with the fixed ports to control the cycle of flow to the fluid pressure cylinders.

16. In a forming machine, a mandrel, pressure members co-acting with the mandrel to fold a blank about the mandrel, fluid pressure operated cylinders carried by certain of the pressure members, and tuckers carried by said members and operated by the cylinders.

17. In a forming machine, a mandrel, pressure members co-acting with the mandrel to fold a blank about the mandrel, certain of said pressure members engaging lateral faces of the mandrel and extending beyond the end of the mandrel, slots in said pressure members adjacent the end of the mandrel and tuckers carried by the pressure members and operating through the slots.

18. In a forming machine, a mandrel, pressure members co-acting with the mandrel to fold a blank about the mandrel, certain of said pressure members engaging lateral faces of the mandrel and extending beyond the end of the mandrel, slots in said pressure members adjacent the end of the mandrel, and fluid pressure cylinders and tuckers operated by said cylinders carried by the pressure members and operating through the slots.

19. In a forming machine, a mandrel, pressure members co-acting with sides of the mandrel and extending beyond the bottom of the mandrel, and a bottom pressure assembly fitting between the extended ends of the side pressure members and means for moving the bottom assembly against and away from the mandrel for co-action with the bottom of the mandrel.

20. In a forming machine, a mandrel, pressure members co-acting with sides of the mandrel and extending beyond the bottom of the mandrel, and a bottom pressure assembly fitting between the extended ends of the side pressure members and co-acting with the bottom of the mandrel, said bottom pressure assembly comprising a support and a plurality of contact members and means for forcing the contact members outwardly to engage the side pressure members.

21. In a forming machine, a mandrel, a fixed surface, means for moving the mandrel to and from the surface, pressure members co-acting with the lateral faces of the mandrel and with the face opposite that engaging the fixed surface, and a bottom pressure member, said member being movable along said surface against the bottom of the mandrel.

22. In a forming machine, a mandrel, a fixed surface, means for moving the mandrel to and from the surface, pressure members extending beyond the bottom of the mandrel co-acting with the lateral faces of the mandrel and with the face opposite that engaging the fixed surface, and a bottom pressure member, said member being movable along said surface between the lateral and opposite pressure members against the bottom of the mandrel.

JULIUS A. ZINN, JR.

(References on following page)

REFERENCES CITED

The following references are of record in the file of this patent:

UNITED STATES PATENTS

| Number | Name | Date |
|---|---|---|
| 12,511 | Koch | Mar. 13, 1855 |
| 119,307 | Bryant et al. | Sept. 26, 1871 |
| 755,754 | Day | Mar. 29, 1904 |
| 952,075 | Henderson | Mar. 15, 1910 |
| 1,015,268 | Otting | Jan. 16, 1912 |
| 1,020,821 | Hesser | Mar. 19, 1912 |
| 2,176,147 | Palmer | Oct. 17, 1939 |
| 2,192,950 | Widell | Mar. 12, 1940 |
| 2,229,864 | Moore | Jan. 28, 1941 |
| 2,480,176 | Zinn | Aug. 30, 1949 |

FOREIGN PATENTS

| Number | Country | Date |
|---|---|---|
| 28,409 | Great Britain | 1896 |